US008000702B2

(12) United States Patent
Dawson et al.

(10) Patent No.: US 8,000,702 B2
(45) Date of Patent: *Aug. 16, 2011

(54) OPTIMIZING LOCATION SERVICES PERFORMANCE BY COMBINING USER PLANE AND CONTROL PLANE ARCHITECTURES

(75) Inventors: Martin Christopher Dawson, Wollongong (AU); Greg Burdett, Georgetown (CA)

(73) Assignee: Andrew, LLC, Hickory, NC (US)

( * ) Notice: Subject to any disclaimer, the term of this patent is extended or adjusted under 35 U.S.C. 154(b) by 1115 days.

This patent is subject to a terminal disclaimer.

(21) Appl. No.: 11/749,647

(22) Filed: May 16, 2007

(65) Prior Publication Data

US 2007/0293239 A1 Dec. 20, 2007

Related U.S. Application Data

(60) Provisional application No. 60/800,436, filed on May 16, 2006.

(51) Int. Cl.
*H04W 4/00* (2009.01)
(52) U.S. Cl. ...................................... 455/433
(58) Field of Classification Search ............... 455/456.1, 455/456.2, 414.2, 413, 432.2, 432.3, 433, 455/453.1, 426.1, 458, 436
See application file for complete search history.

(56) References Cited

U.S. PATENT DOCUMENTS

| | | |
|---|---|---|
| 3,150,372 A | 9/1964 | Groth, Jr. |
| 3,659,085 A | 4/1972 | Potter et al. |
| 4,728,959 A | 3/1988 | Maloney |
| 4,814,751 A | 3/1989 | Hawkins |
| 4,845,504 A | 7/1989 | Roberts et al. |
| 4,891,650 A | 1/1990 | Sheffer |
| 5,056,106 A | 10/1991 | Wang |
| 5,218,618 A | 6/1993 | Sagey |
| 5,317,323 A | 5/1994 | Kennedy et al. |
| 5,327,144 A | 7/1994 | Stilp et al. |
| 5,365,544 A | 11/1994 | Schilling |
| 5,372,144 A | 12/1994 | Mortier et al. |
| 5,404,376 A | 4/1995 | Dent |
| 5,423,067 A | 6/1995 | Manabe |
| 5,465,289 A | 11/1995 | Kennedy |
| 5,506,863 A | 4/1996 | Meidan et al. |
| 5,506,864 A | 4/1996 | Schilling |
| 5,508,708 A | 4/1996 | Ghosh et al. |
| 5,512,908 A | 4/1996 | Herrick |

(Continued)

FOREIGN PATENT DOCUMENTS

JP 06-347529 12/1994

(Continued)

OTHER PUBLICATIONS

Y. Zhao, "Standardization of Mobile Phone Positioning for 3G Systems," IEEE Communications Magazine, Jul. 2002, pp. 108-116.

(Continued)

*Primary Examiner* — Melody Mehrpour
(74) *Attorney, Agent, or Firm* — Duane Morris, LLP

(57) ABSTRACT

A system and method is disclosed that determines the position of a mobile device using information obtained by employing a first location determination protocol (or modality) to control the efficient or advantageous invocation of a second location determination protocol (or modality). The system utilizes information readily available from the Control plane along with request parameters and device capabilities to determine whether to invoke a CoPL or SUPL session.

30 Claims, 17 Drawing Sheets

U.S. PATENT DOCUMENTS

| | | |
|---|---|---|
| 5,515,419 A | 5/1996 | Sheffer |
| 5,519,760 A | 5/1996 | Borkowski et al. |
| 5,559,864 A | 9/1996 | Kennedy |
| 5,592,180 A | 1/1997 | Yokev et al. |
| 5,608,410 A | 3/1997 | Stilp et al. |
| 5,614,914 A | 3/1997 | Bolgiano et al. |
| 5,675,344 A | 10/1997 | Tong et al. |
| 5,736,964 A | 4/1998 | Ghosh et al. |
| 5,815,538 A | 9/1998 | Grell et al. |
| 5,825,887 A | 10/1998 | Lennen |
| 5,870,029 A | 2/1999 | Otto et al. |
| 5,920,278 A | 7/1999 | Tyler et al. |
| 5,952,969 A | 9/1999 | Hagerman et al. |
| 5,959,580 A | 9/1999 | Maloney et al. |
| 5,960,341 A | 9/1999 | LeBlanc et al. |
| 5,973,643 A | 10/1999 | Hawkes et al. |
| 5,987,329 A | 11/1999 | Yost |
| 6,014,102 A | 1/2000 | Mitzlaff et al. |
| 6,047,192 A | 4/2000 | Maloney |
| 6,091,362 A | 7/2000 | Stilp |
| 6,097,336 A | 8/2000 | Stilp |
| 6,097,959 A | 8/2000 | Yost |
| 6,101,178 A | 8/2000 | Beal |
| 6,108,555 A | 8/2000 | Maloney et al. |
| 6,115,599 A | 9/2000 | Stilp |
| 6,119,013 A | 9/2000 | Maloney et al. |
| 6,127,975 A | 10/2000 | Maloney |
| 6,144,711 A | 11/2000 | Raleigh et al. |
| 6,172,644 B1 | 1/2001 | Stilp |
| 6,184,829 B1 | 2/2001 | Stilp |
| 6,188,351 B1 | 2/2001 | Bloebaum |
| 6,191,738 B1 | 2/2001 | Pfeil et al. |
| 6,201,499 B1 | 3/2001 | Hawkes et al. |
| 6,201,803 B1 | 3/2001 | Munday et al. |
| 6,212,319 B1 | 4/2001 | Cayrefourcq |
| 6,233,459 B1 | 5/2001 | Sullivan et al. |
| 6,246,884 B1 | 6/2001 | Karmi et al. |
| 6,266,013 B1 | 7/2001 | Stilp et al. |
| 6,281,834 B1 | 8/2001 | Stilp |
| 6,285,321 B1 | 9/2001 | Stilp et al. |
| 6,288,675 B1 | 9/2001 | Maloney |
| 6,288,676 B1 | 9/2001 | Maloney |
| 6,295,455 B1 | 9/2001 | Fischer et al. |
| 6,311,043 B1 | 10/2001 | Haardt et al. |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,351,235 B1 | 2/2002 | Stilp |
| 6,366,241 B2 | 4/2002 | Pack |
| 6,388,618 B1 | 5/2002 | Stilp et al. |
| 6,400,320 B1 | 6/2002 | Stilp et al. |
| 6,407,703 B1 | 6/2002 | Minter et al. |
| 6,463,290 B1 | 10/2002 | Stilp et al. |
| 6,470,195 B1 | 10/2002 | Meyer |
| 6,477,161 B1 | 11/2002 | Hudson |
| 6,483,460 B2 | 11/2002 | Stilp et al. |
| 6,492,944 B1 | 12/2002 | Stilp |
| 6,501,955 B1 | 12/2002 | Durrant et al. |
| 6,519,465 B2 | 2/2003 | Stilp et al. |
| 6,546,256 B1 | 4/2003 | Maloney |
| 6,553,322 B1 | 4/2003 | Ignagni |
| 6,563,460 B2 | 5/2003 | Stilp et al. |
| 6,571,082 B1 | 5/2003 | Rahman |
| 6,603,428 B2 | 8/2003 | Stilp |
| 6,603,761 B1 | 8/2003 | Wang |
| 6,640,106 B2 | 10/2003 | Gutowski et al. |
| 6,646,604 B2 | 11/2003 | Anderson |
| 6,661,379 B2 | 12/2003 | Stilp et al. |
| 6,765,531 B2 | 7/2004 | Anderson |
| 6,771,625 B1 | 8/2004 | Beal |
| 6,771,969 B1 | 8/2004 | Chinoy |
| 6,782,264 B2 | 8/2004 | Anderson |
| 6,834,234 B2 | 12/2004 | Scherzinger et al. |
| 6,839,539 B2 | 1/2005 | Durrant et al. |
| 6,845,240 B2 | 1/2005 | Carlson et al. |
| 6,859,172 B2 | 2/2005 | Powers et al. |
| 6,871,077 B2 | 3/2005 | Kennedy, Jr. |
| 6,873,290 B2 | 3/2005 | Anderson et al. |
| 6,876,859 B2 | 4/2005 | Anderson et al. |
| 6,920,329 B2 | 7/2005 | Kennedy, Jr. et al. |
| 6,922,170 B2 | 7/2005 | Alexander, Jr. |
| 6,952,158 B2 | 10/2005 | Kennedy, Jr. |
| 6,987,979 B2 | 1/2006 | Carlsson |
| 6,996,392 B2 | 2/2006 | Anderson |
| 7,023,383 B2 | 4/2006 | Stilp et al. |
| 7,167,713 B2 | 1/2007 | Anderson |
| 7,271,765 B2 | 9/2007 | Stilp et al. |
| 7,340,259 B2 | 3/2008 | Maloney |
| 7,427,952 B2 | 9/2008 | Bull et al. |
| 7,440,762 B2 | 10/2008 | Maloney et al. |
| 7,593,738 B2 | 9/2009 | Anderson |
| 2002/0172223 A1 | 11/2002 | Stilp et al. |
| 2003/0064734 A1 | 4/2003 | Stilp et al. |
| 2003/0139188 A1 | 7/2003 | Chen et al. |
| 2003/0190919 A1 | 10/2003 | Niemenmaa |
| 2003/0203738 A1 | 10/2003 | Brown et al. |
| 2004/0043775 A1 | 3/2004 | Kennedy, Jr. et al. |
| 2004/0102196 A1* | 5/2004 | Weckstrom et al. ........ 455/456.1 |
| 2004/0132466 A1 | 7/2004 | Kennedy, Jr. et al. |
| 2004/0137900 A1* | 7/2004 | Varonen et al. ................ 455/433 |
| 2004/0142702 A1* | 7/2004 | Hefner et al. ............... 455/456.1 |
| 2004/0203921 A1 | 10/2004 | Bromhead et al. |
| 2004/0218664 A1 | 11/2004 | Kennedy, Jr. et al. |
| 2004/0252752 A1 | 12/2004 | Kennedy, Jr. et al. |
| 2005/0058182 A1 | 3/2005 | Kennedy, Jr. et al. |
| 2005/0136945 A1 | 6/2005 | Kennedy, Jr. et al. |
| 2005/0164712 A1 | 7/2005 | Kennedy, Jr. et al. |
| 2005/0192026 A1 | 9/2005 | Carlson et al. |
| 2006/0003695 A1 | 1/2006 | Kennedy, Jr. et al. |
| 2006/0003775 A1 | 1/2006 | Bull et al. |
| 2006/0030333 A1 | 2/2006 | Ward et al. |
| 2006/0116130 A1 | 6/2006 | Kennedy, Jr et al. |
| 2006/0125695 A1 | 6/2006 | Kennedy, Jr. et al. |
| 2006/0141998 A1 | 6/2006 | Kennedy, Jr. et al. |
| 2006/0154607 A1 | 7/2006 | Kenney, Jr. et al. |
| 2006/0240836 A1 | 10/2006 | Kennedy, Jr. et al. |
| 2007/0087689 A1 | 4/2007 | Kennedy, Jr. et al. |
| 2007/0111746 A1 | 5/2007 | Anderson et al. |
| 2007/0155401 A1 | 7/2007 | Ward et al. |
| 2007/0155489 A1* | 7/2007 | Beckley et al. .................. 463/29 |
| 2007/0202885 A1 | 8/2007 | Kennedy, Jr. et al. |
| 2007/0293215 A1* | 12/2007 | Dawson ........................ 455/433 |
| 2007/0298793 A1* | 12/2007 | Dawson ..................... 455/435.1 |
| 2008/0132244 A1 | 6/2008 | Anderson et al. |
| 2008/0132247 A1 | 6/2008 | Anderson et al. |
| 2008/0137524 A1 | 6/2008 | Anderson et al. |
| 2008/0158059 A1 | 7/2008 | Bull et al. |
| 2008/0160952 A1 | 7/2008 | Bull et al. |
| 2008/0160953 A1 | 7/2008 | Mia et al. |
| 2008/0161015 A1 | 7/2008 | Maloney et al. |
| 2008/0248811 A1 | 10/2008 | Maloney et al. |
| 2008/0261611 A1 | 10/2008 | Mia et al. |
| 2008/0261612 A1 | 10/2008 | Mia et al. |
| 2008/0261613 A1 | 10/2008 | Anderson et al. |
| 2008/0261614 A1 | 10/2008 | Mia et al. |
| 2009/0005061 A1 | 1/2009 | Ward et al. |

FOREIGN PATENT DOCUMENTS

| | | |
|---|---|---|
| WO | 2006088472 A1 | 8/2006 |

OTHER PUBLICATIONS

C. Drane, M. MacNaughtan, and C. Scott, "Positioning GSM Telephones," IEEE Communications Magazine, Apr. 1998, pp. 46-54, 59.

J. Caffery, Jr., and G. Stuber, "Overview of Radiolocation in CDMA Cellular Systems," IEEE Communications Magazine, Apr. 1998, pp. 38-45.

T. Rappaport, J.H. Reed and B.D. Woerner, "Position Location Using Wireless Communications on Highways of the Future," IEEE Communications Magazine, Oct. 1996, pp. 33-41.

I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman, "A Comparison of the Accuracy of TDOA and TOA Location Algorithms with Equivalent Receiver Geometry," Defence R&D Canada Technical Memorandum (DREO TM 2001-063), Oct. 2001, pp. 1-53.

L. Mailaender, "On the Geolocation Bounds for Round-Trip Time-of-Arrival and All Non-Line-of-Sight Channels", EURASIP Journal on Advances in Signal Processing, vol. 2008, pp. 1-10.

N. Agarwal, L. Chaudran-Wadi, and V. Apte, "Capacity Analysis of the GSM Short Message Service", Indian Institute of Technology Bombay, www.cse.iitb:ac.in/~varsha/allpapers/wirelessi/ncc03cam.pdf, 2004, pp. 1-5.

J.D. Bard, and F.M. Ham, "Time Difference of Arrival Dilution of Precision and Applications," IEEE Transactions on Signal Processing, vol. 47, No. 2, pp. 521-523, Feb. 1999.

K.C. Ho, and W. Xu, "An Accurate Algebraic Solution for Moving Source Location Using TDOA and FDOA Measurements", IEEE Transactions on Signal Processing, vol. 52, No. 9, Sep. 2004, pp. 2453-2463.

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.

M. Rahnema, "Overview of the GSM System and Protocol Architecture," IEEE Communications Magazine, Apr. 1993, pp. 92-100.

S. Stein, "Algorithms for Ambiguity Function Processing," IEEE Transactions on Acoustics, Speech, and Signal Processing, vol. ASSP-29, No. 3, Jun. 1981, pp. 588-599.

M. Vanderveen, C.B. Papadias, and A. Paulraj, "Joint Angle and Delay Estimation (JADE) for Multipath Signals Arriving at an Antenna Array", IEEE Communications Letters, vol. 1, No. 1, Jan. 1997, pp. 12-14.

M. Wax and I. Ziskind, "On Unique Localization of Multiple Sources by Passive Sensor Arrays," IEEE Transactions on Acoustics, Speech, and Signal Processing, vol. 37, No. 7, Jul. 1989, pp. 996-1000.

B. Yang, "Projection Approximation Subspace Tracking," IEEE Transactions on Signal Processing, vol. 43, No. 1, Jan. 1995, pp. 95-107.

Amir Leshem, Mati Wax, "Array Calibration in the Presence of Multipath," IEEE Transactions on Signal Processing, vol. 48, No. 1, pp. 53-59, Jan. 2000.

Xin Wang, Zongxin Wang and Bob O'Dea, "A TOA-Based Location Algorithm Reducing the Errors Due to Non-Line-of-Sight (NLOS) Propagation," IEEE Trans. Vehicular Technology, vol. 52, No. 1, Jan. 2003, pp. 112-116.

M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.

R. Schmidt, "Multiple Emitter Location and Signal Parameter Estimation,". IEEE Transactions on Antennas and Propagation, vol. AP-34, No. 3, Mar. 1986, pp. 276-280.

Y. Chen, M. Zoltowski, "Joint Angle and Delay Estimation for DS-CDMA with Application to Reduced Dimension Space-Time Rake Receivers," Mar. 1999, pp. 2933-2936.

A.J. Paulraj, C.B. Papadias, "Space-Time Processing for Wireless Communications", IEEE Signal Processing Magazine, vol. 11, Nov. 1997, pp. 49-83.

C.B. Papadias, A.J. Paulraj, "Space-Time Signal Processing for Wireless Communications: A Survey", Information Systems Laboratory, Stanford University.

M. Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.

Mati Wax, "Position Location from Sensors with Position Uncertainty," IEEE Transactions Aerospace and Electronic Systems, vol. AES-19, No. 5, Sep. 1983, pp. 658-662.

D.J. Torrieri, "Statistical Theory of Passive Location Systems", IEEE Transactions Aerospace and Electronic Systems, vol. AES-20, No. 2, Mar. 1984, pp. 183-198.

Y.T. Chan and K.C. Ho, "A Simple and Efficient Estimator for Hyperbolic Location", IEEE Transactions Signal Processing, vol. 42, No. 8, Aug. 1994, pp. 1905-1915.

W.H. Foy, "Position-Location Solutions by Taylor-Series Estimation", IEEE Transactions Aerospace and Electronic Systems, vol. AES-12, No. 2, Mar. 1976, pp. 187-194.

R.G. Stansfield, "Statistical Theory of DF Fixing", Journal IEE 94, Part III A, Oct. 1947, pp. 762-770.

M.P. Wylie and J. Holtzman, "The Non-Line of Sight Problem in Mobile Location Estimation", Process IEEE 5th International Conference on Universal Personal Communications, vol. 2, Oct. 1996, pp. 827-831.

L.Cong and W. Zhuang, "Non-Line-of-Sight Error Mitigation in TDOA Mobile Location", Process IEEE Global Telecommunications Conference, vol. 1, Sep. 2001, pp. 680-684.

P.C. Chen, "A Non-Line-of-Sight Error Mitigation Algorithm in Location Estimation", Process IEEE Conference on Wireless Communications Networking, vol. 1, 1999, pp. 316-320.

N.J. Thomas, D.G.M. Cruickshank and D.I. Laurenson, "Performance of a TDOA-AOA Hybrid Mobile Location System", 3G Mobile Communication Technologies, Conference Publication No. 477, Mar. 2001, pp. 216-220.

J. Caffery, Jr., and G. Stuber, "Subscriber Location in CDMA Cellular Networks," IEEE Transactions on Vehicular Technology, vol. 47, No. 2, May 1998, pp. 406-416.

J. Caffery. Jr., "A New Approach to the Geometry of TOA Location," IEEE, VTC 2000, pp. 1943-1949.

M.Silventoinen and T. Rantalainen, "Mobile Station Emergency Locating in GSM", Process IEEE International Conference, Personal Wireless Communications, vol. 1, 1996, pp. 232-238.

* cited by examiner

OPTIMIZING LOCATION SERVICES PERFORMANCE BY COMBINING USER PLANE AND CONTROL PLANE ARCHITECTURES

The disclosure claims the filing-date benefit of Provisional Application No. 60/800,436, filed 16 May 2006, the specification of which is incorporated herein in its entirety.

CROSS-REFERENCE TO RELATED APPLICATIONS

This disclosure is related to application Ser. No. 11/749,621 and application Ser. No. 11/749,634, both filed concurrently herewith, the specifications of which are incorporated herein in their entireties.

BACKGROUND

This disclosure generally relates to position or location approaches in GSM, CDMA, and UMTS networks. Further, this disclosure relates to user and control plane location approaches in core networks and GERAN, UTRAN, and Complementary Access radio access networks.

Mobile communications infrastructure is typically conceptualized in two generally separate components: the core network (CN); and the radio access network (RAN). Together, this infrastructure enables user equipment (UE), the RAN, and CN to be developed and implemented separately according to the permissive standards set by organizations such as 3GPP and ITU. Thus, various types of RANs, such as GERAN or UTRAN, can be paired with a single UMTS CN. Also, the UMTS standards provide for protocol separation between data related to user communications and data related to control of the network's various components. For example, within a UMTS mobile communications network, User Plane (UP) bearers are responsible for the transfer of user data, including but not limited to voice or application data. Control Plane (CoP) bearers handle control signaling and overall resource management.

As mobile networks transition towards 3G and beyond, location services (LCS, applications of which are sometimes referred to as Location Based Services, or LBS) have emerged as a vital service component enabled or provided by wireless communications networks. In addition to providing services conforming to government regulations such as wireless E911, LCS solutions also provide enhanced usability for mobile subscribers and revenue opportunities for network operators and service providers alike.

Position includes geographic coordinates, relative position, and derivatives such as velocity and acceleration. Although the term "position" is sometimes used to denote geographical position of an end-user while "location" is used to refer to the location within the network structure, these terms may often be used interchangeably without causing confusion. Common position measurement types used in mobile positioning or LCS include, but are not limited to, range, proximity, signal strength (such as path loss models or signal strength maps), round trip time, time of arrival, and angle of arrival. Multiple measurements can be combined, sometimes depending on which measurement types are available, to measure position. These combination approaches include, but are not limited to, radial (for example, employing multiple range measurements to solve for best agreement among circular loci), angle (for example, combining range and bearing using signal strength or round trip time), hyperbolic (for example, using multiple time-of-arrival), and real time differencing (for example, determining actual clock offsets between base stations).

Generally, LCS methods are accomplished through CoP or UP methods. CoP Location (CoPL) refers to using control signaling within the network to provide location information of the subscriber or UE. UP Location (UPL), such as Secure User Plane Location (SUPL) uses user data to provide location information. CoPL location approaches include, but are not limited to, Angle-of-Arrival (AoA), Observed Time-Difference-of-Arrival (OTDoA), Observed-Time-Difference (OTD), Enhanced-OTD (E-OTD), Assisted Global Positioning System (A-GPS), and Assisted Galileo Navigation Satellite System (A-GNSS). UPL approaches include, but are not limited to, Assisted Global Positioning System (A-GPS), and Assisted Galileo Navigation Satellite System (A-GNSS), where this position data is communicated over Internet Protocol (IP).

There are two established architectures associated with location determination in modern cellular networks. They are Control Plane (CoP) and User Plane (UP) architectures. Typically location requests are sent to a network through a query gateway function 1. Depending on the network implementation CoP 15 or UP 10 may be used but not a combination of both, as shown in FIG. 1. Note that queries may also come directly from the target device itself rather than via a gateway. Similarly, CoP or UP may be used but not both.

The difference between user plane and control plane, strictly, is that the former uses the communication bearer established with the device in order to communicate measurements. The latter uses the native signaling channels supported by the controlling network elements of the core and access to communicate measurements. As such, CoPL supports AGPS—it uses control plane signaling interfaces to communicate GPS data to/from the handset. Similarly UPL can do EOTD—the handset takes the timing measurements but it communicates them to the location platform using the data bearer.

UPL has the advantage of not depending on specific access technology to communicate measurement information. CoPL has the advantage that it can access and communicate measurements which may not be available to the device. Current models require network operators to deploy one or the other; CoPL or UPL Control Plane Location (CoPL) uses the native signaling plane of the network to establish sessions and communicate messages associated with location requests and to communicate measurements used for determining location. The control plane is the signaling infrastructure used for procedures such as call control, hand-off, registration, and authentication in a mobile network; CoPL uses this same infrastructure for the performing location procedures. CoPL can utilize measurements made by both the control plane network elements as well as the end-user device being located.

FIG. 2A illustrates an exemplary architectural diagram of CoPL. The mobile station or mobile appliance 101 communication with the base transceiver station (BTS) 105 via wireless interface Um. The base station controller (BCS) 107 manages radio resources including the BTS 105 via the Abis interface. The Abis interface is an open interface completely defined as part of the ETSI specification for GSM and carries the call set up information, including voice channel assignments between the BSC 107 and BTS 105. The Mobile switching center/visitor's location register (MSC/VLR) 113 coordinates between the mobile appliance communication network and the global mobile location center (GMLC) 117.

In operation, a location measurement device (not shown) may be connected to the BSC 107 via the Abis wire line interface and makes measurements on the RF signals of the Um interface, along with other measurements to support one or more of the position methods associated with the CoPL. The measurements from the location measurement units are sent to a servicing mobile location center (SMLC) 109 via BCS 107 where the location of MS 101 can be determined. The BTS 105, BSC 107 and SMLC 109 form a base station subsystem (BSS) 103.

The GMLC 117 is connected to the home location register (HLR)111 over an Lh interface and the MSC/VLR 113 over an Lg interface. The global mobile switching center (GMSC) 115 is operably connected to the MSC/VLR 113.

The operation of a CoPL architecture is shown in FIG. 2B. This shows the 3GPP location services architecture. The gateway mobile location centre (GMLC) 117 is the network element that receives the location requests. The GMLC queries the HLR 111 over the Lh interface to find out which part of the access network 107 the target device is currently being served by. The GMLC 117 sends a location request to the current serving core network node 113 via the Lg interface. The current serving core network node 113 (e.g. MSC or serving GPRS service node (SGSN)) then passes the request to the part of the access network 107 that the target device is attached to z(a GERAN BSC or UTRAN RNC for example). This access network element 107 then invokes the facilities of the SMLC 109. The location request session between the access network node 107 and the SMLC 109 provides a channel by which the SMLC 109 can ask for network measurements or to send messages to the end-user device 101 so that device measurement information can be exchanged. The SMLC 109 may also obtain location measurement information from external devices 110 such as location measurement units (LMUs) which take RF readings from the air interface for example. Similarly, the device may also take measurements from external systems, such as GPS satellites, and communicate these to the SMLC 109.

Developed as an alternative to CoPL, Secure User Plane Location (SUPL) is set of standards managed by the Open Mobile Alliance (OMA) to transfer assistance data and positioning data over IP to aid network and terminal-based positioning technologies in ascertaining the position of a SUPL Enabled Terminal (SET).

User Plane Location (UPL) does not explicitly utilize the control plane infrastructure. Instead it assumes that a data bearer plane is available between the location platform and the end-user device. That is, a control plane infrastructure may have been involved in establishing the data bearer so that communication can occur with the device but no location-specific procedural signaling occurs over the control plane. As such UPL is limited to obtaining measurements directly from the end-user device itself.

SUPL includes a Location User Plan (Lup) reference point, the interface between the SUPL Location Platform (SLP) and SET, as well as security, authentication, authorization, charging functions, roaming, and privacy functions. For determining position, SUPL generally implements A-GPS, A-GNSS, or similar technology to communicate location data to a designated network node over Internet Protocol (IP).

FIG. 3A illustrates an exemplary architectural diagram for SUPL. The illustrated entities represent a group of functions, and not necessarily separate physical devices. In the SUPL architecture, a SUPL Location Platform (SLP) 201 and SUPL-enabled terminal (SET) 207 are provided. The SLP 201 generally includes a SUPL Location Center (SLC) 203 and a SUPL Positioning Center (SPC) 205. The SLC and SPC optionally communicate over the L1p interface, for instance, when the SLC and SPC are deployed as separate entities. The SET 207 generally includes a mobile location services (MLS) application, an application which requests and consumes location information, or a SUPL Agent, a service access point which accesses the network resources to obtain location information.

For any SET, a SLP 201 can perform the role of the home SLP (H-SLP), visited SLP (V-SLP) or emergency SLP (E-SLP). An H-SLP for a SET includes the subscription, authentication, and privacy related data for the SET and is generally associated with a part of the SET's home PLMN. A V-SLP for a SET is an SLP selected by an H-SLP or E-SLP to assist positioning. An E-SLP for a SET is an SLP associated with or contained in the PLMN serving the SET. The E-SLP may performs positioning in association with emergency services initiated by the SET.

The SLC 203 coordinates operations of SUPL in the network and interacts with the SET over the User Plane bearer to perform various functions including, but not limited to, privacy, initiation, security, roaming, charging, service management, and positioning calculation. The SPC 205 supports various functions including, but not limited to, security, assistance delivery, reference retrieval, and positioning calculation.

SUPL session initiation is network-initiated or SET-initiated. The SUPL architecture provides various alternatives for initiating and facilitating SUPL functions. For example, a SUPL Initiation Function (SIF) is optionally initiated using a Wireless Application Protocol Push Proxy Gateway (WAP PPG) 211, a Short Message Service Center (SMSC/MC) 213, or a User Datagram Protocol/Internet Protocol (UDP/IP) 215 core, which form user plane bearer 220.

The operation of UPL is shown in FIG. 3B. Secure User Plane Location is a standard specification for UPL. Location requests come to the SLP 201 from external applications or from the end-user device itself. If a data session does not exist between the SLP 201 and the device 207 already, then the SLP 201 may initiate a request such that an IP session (user plane bearer 220) is established between the device 207 and the SLP 201. From then on, the SLP 201 may request measurement information from the device 207. It device may also take measurements from the network 107 or from external systems such as GPS 210. Because there is no control plane connectivity to the network, the SLP 201 cannot directly request any measurement information from the network 107 itself.

More information on SUPL, including the Secure User Plane Location Architecture documentation (OMA-AD-SUPL), can be readily obtained through OMA.

User Plane location, especially after the development of SUPL standards, is generally thought to provide an affordable and rapid upgrade path to provide LCS for mobile network operators currently without an CoPL solution. However, UPL (including SUPL) suffers from several drawbacks compared to CoPL.

A standard user-plane location architecture has to be applied to all location requests for a given location based service because there is no a-priori knowledge of which part of the network the device is being served by, nor what the location capabilities of the device are. User-plane signaling has to be invoked every time and, in many scenarios, may fail completely if the network or device are not compatible with this architecture.

When a pure user-plane approach is used, there is no ability to request network measurement information from the radio controllers used by the network. This additional information, which can be useful as an alternative or to augment the measurements obtained from the device, is not accessible. This compromises in terms of the location system's ability to provide optimal results.

A significant motivator for SUPL were the significant dependencies on the vendors for access equipment, specifically the radio access controllers, to support consistent standards behavior. There is also a dependency on core network signaling for consistent LCS service. However, the issue of consistent implementation of the MAP signaling has not been found to be significant.

Further, the basic LCS functionality at the BSS 103 has become increasingly commoditized. For instance, basic Lb interface and PLR messaging are nearly universally supported across access vendors.

Current definitions of SUPL (per the OMA) decouple the end-to-end signaling from the control plane. This bypasses much of the value-add that the core control-plane offers. Such offerings include, but are not limited to, native access-network emergency service application support, privacy checking against subscriber profile in the HLR, ability to support LCS requests from roaming partners' GMLCs. In addition, the lowest common denominator functionality of the access control-plane (Lb interface functions) is lost. These lost abilities include, but are not limited to, getting a rapid enhanced-cell fix with TA/NMR measurements, performing multiple TA requests to augment network measurement information, obtaining network measurements (e.g. UTDOA request) not available from a SET.

Further, UPL does not associate position information with a voice call from a user. Accordingly, UPL approaches are not used for certain emergency services, such as e911 in which the physical location directly associated with an emergency communication must be automatically ascertained.

Much of the benefits of control-plane functionality, therefore, is sacrificed with the wholesale adoption of a user-plane approach.

Therefore, regulatory requirements and evolving commercial demands illustrate the disadvantages of a CoPL-only or SUPL-only network architecture.

SUMMARY

Methods, which obviates deficiencies of the prior art, are disclosed for determining the position of a mobile device using information obtained by employing a first location determination protocol (or modality) to control the efficient or advantageous invocation of a second location determination protocol (or modality).

An additional method is disclosed for determining the position of a mobile device by comparing or combining the results of multiple position determination protocols (or modalities).

Corresponding systems, devices, and computer program products are also disclosed. Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the claims.

BRIEF DESCRIPTION OF THE DRAWINGS

Various aspects of the present disclosure will be or become apparent to one with skill in the art by reference to the following detailed description when considered in connection with the accompanying exemplary non-limiting embodiments, wherein.

DETAILED DESCRIPTION

One aspect of the present disclosure includes using information obtained by employing a first location determination protocol (or modality) to control the efficient or advantageous invocation of a second location determination protocol (or modality) in determining the position of a mobile device. Another aspect includes comparing or combining the results of multiple position determination protocols (or modalities) to enhance determination of a mobile device's position.

In yet another aspect, a multi-plane architecture for mobile device location determination, is provided. In a further aspect of the present disclosure, modality arbitration in a multi-plane architecture, is provided. In an additional aspect, roaming optimization including invoking an appropriate location modality, is provided.

Figure 4:
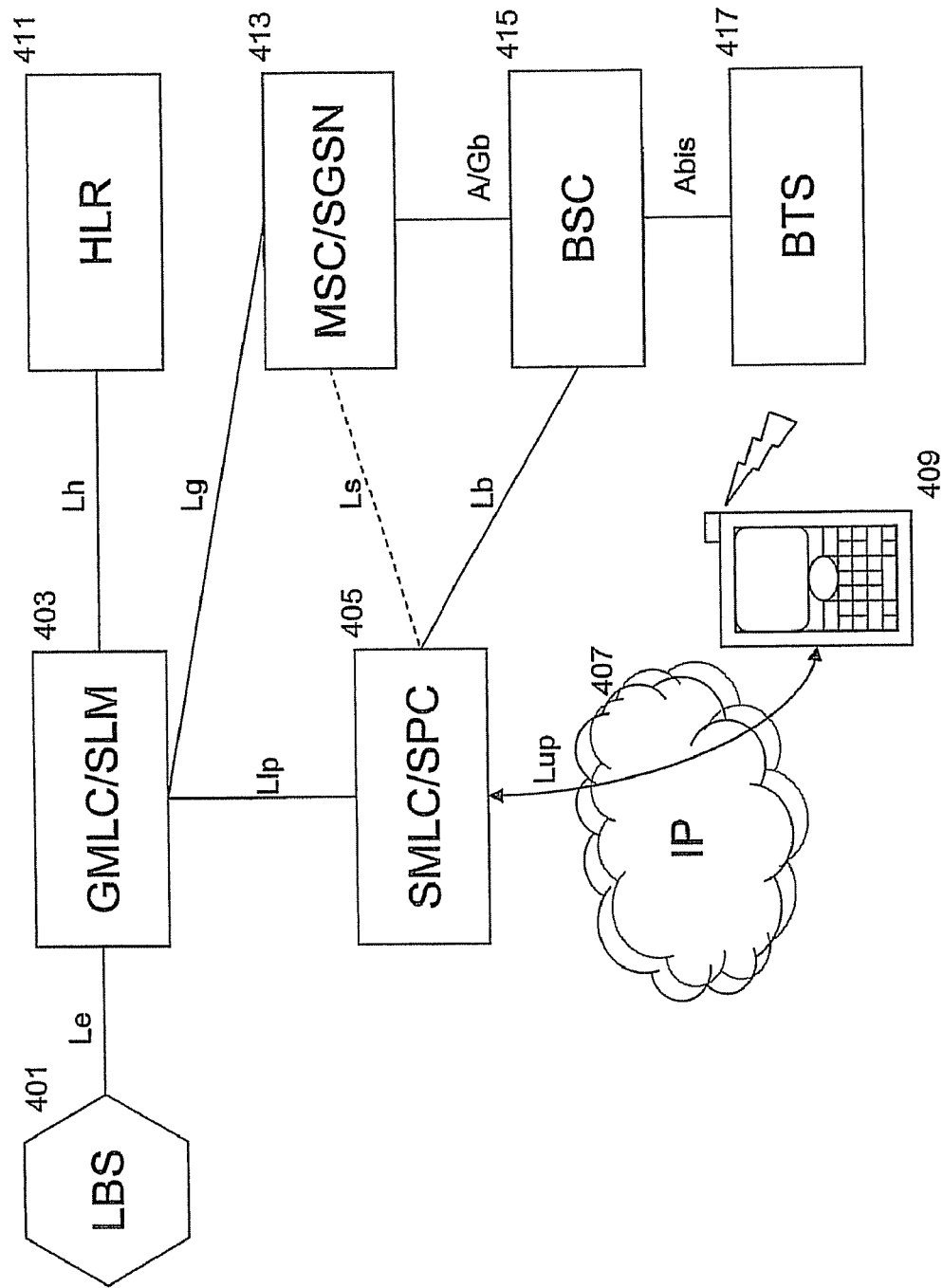
FIG. 4 is a schematic architectural illustration of a disclosed embodiment including a dual-plane architecture.

Rather than limiting the scope of location procedures to be only CoPL or UPL based, it is possible to combine the two architectures. Such an architecture would arbitrate in terms of which plane to use for a given location request, or it may combine the functionality of both planes for a given location request. This is shown in FIG. 4. At the simplest level of arbitration, the dual-plane gateway function may apply specific criteria to decide whether to invoke CoPL or UPL. It may do this based on the application that is making the request, some knowledge of the capabilities of the end-user device, and/or some knowledge of the capabilities of the part of the network currently serving the device.

Generally speaking, if UPL is selected at the gateway function, then the rest of the location procedures are limited to UPL capabilities. This is because the network generally needs to establish a session with the serving location function before that function is able to obtain measurements via the network. If UPL is invoked, then the communication channel associated with the location session will not exist for the purposes of obtaining measurements via the network. However, if CoPL is invoked first, then the measurement request channel will be in place and, further, the serving node will still have the option of establishing an UPL session with the end device. The benefit of this is that, for example, GPS measurements may be obtained from an UPL-only device and be combined with measurements obtained from the network and other elements such as LMUs.

Figure 1:
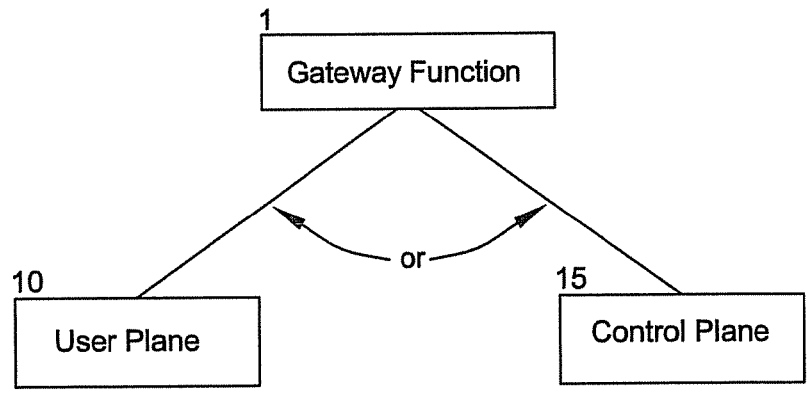
FIG. 1 illustrates prior art gateway function.
Figure 2B:
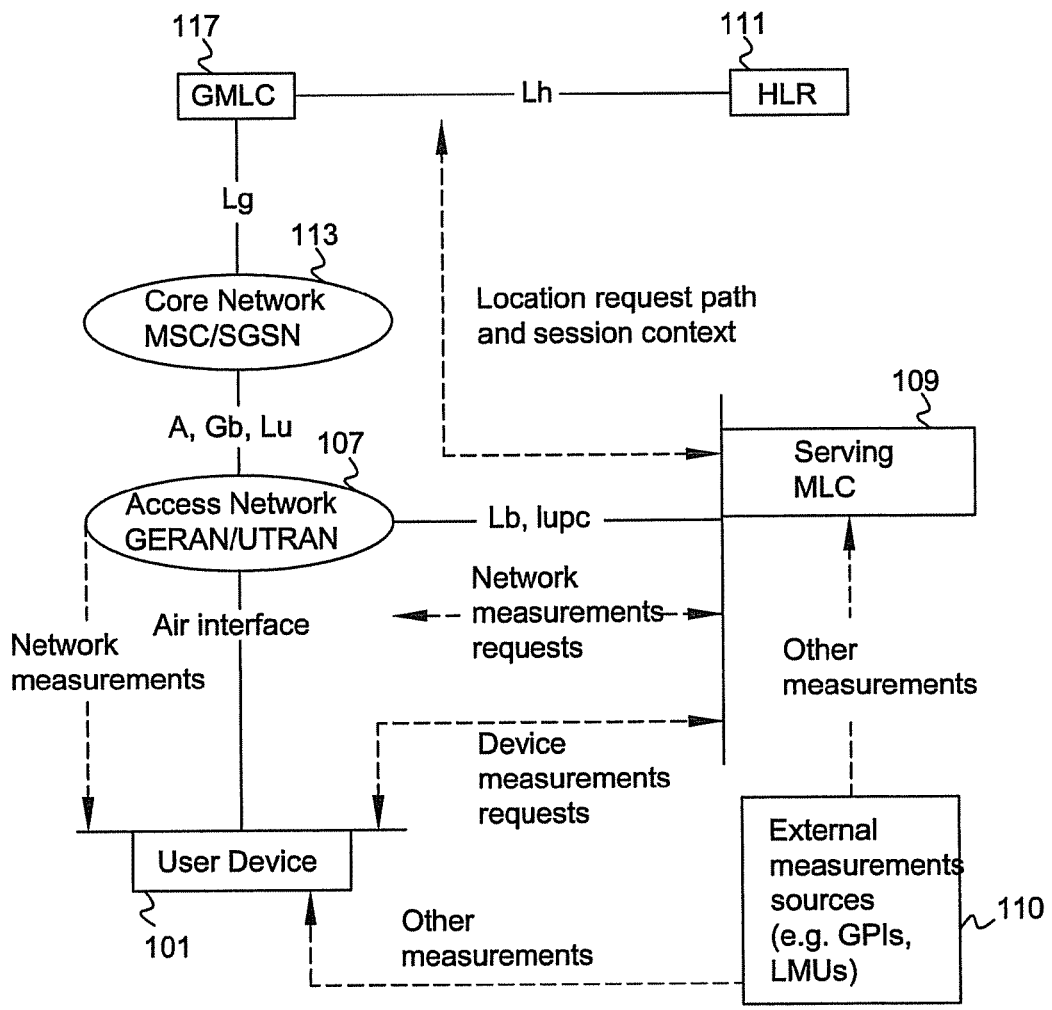
FIG. 2B illustrates operation of an exemplary CoPL architecture
Figure 2A:
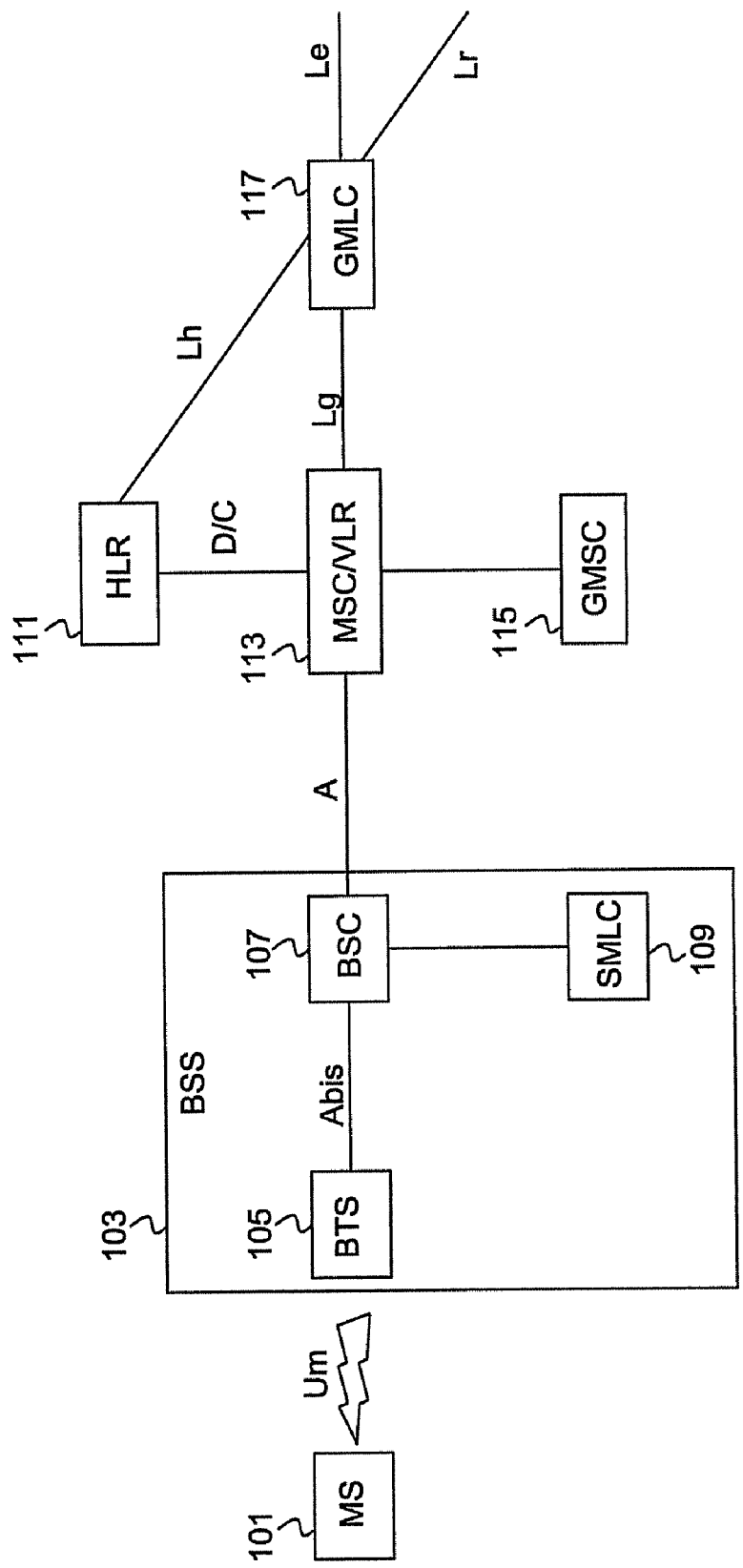
FIG. 2A illustrates an exemplary architectural diagram for CoPL.
Figure 3A:
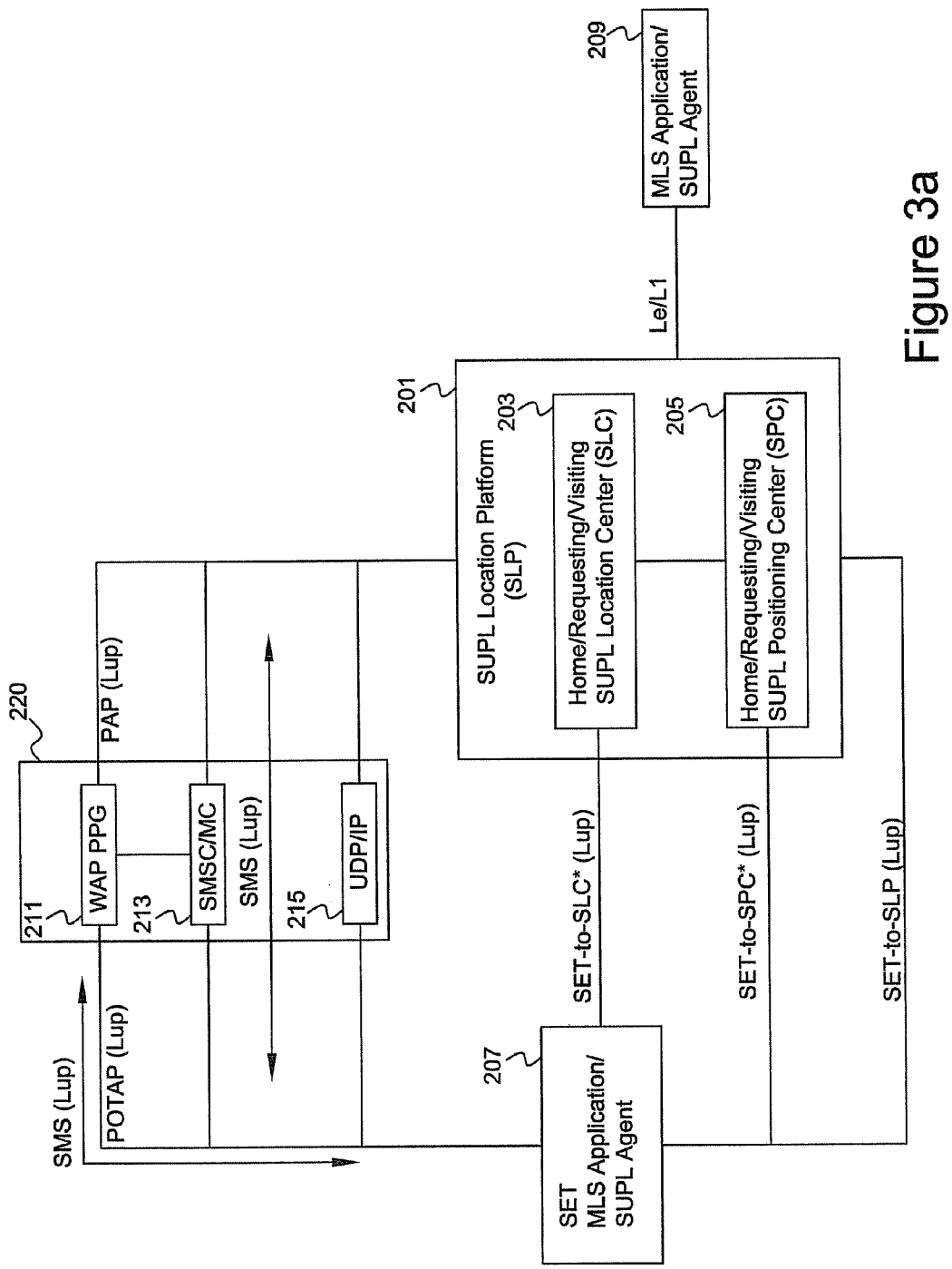
FIG. 3A illustrates an exemplary architectural diagram for SUPL.
Figure 3B:
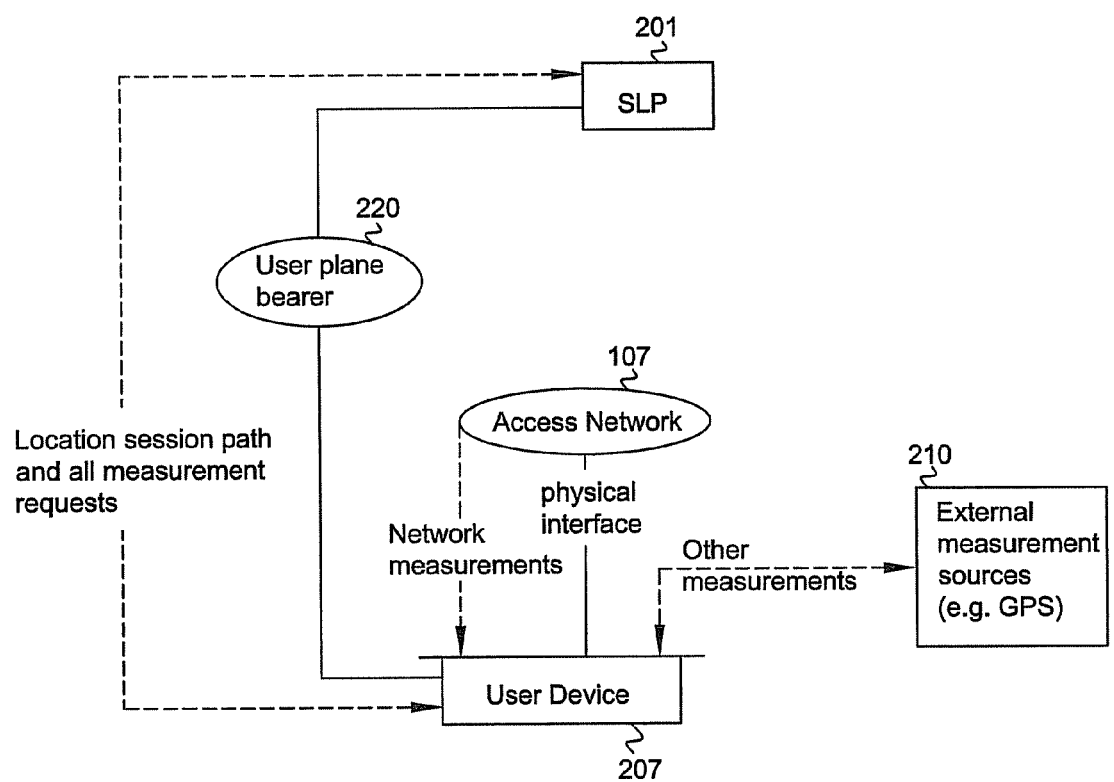
FIG. 3B illustrates operation of an exemplary SUPL architecture
Figure 15:
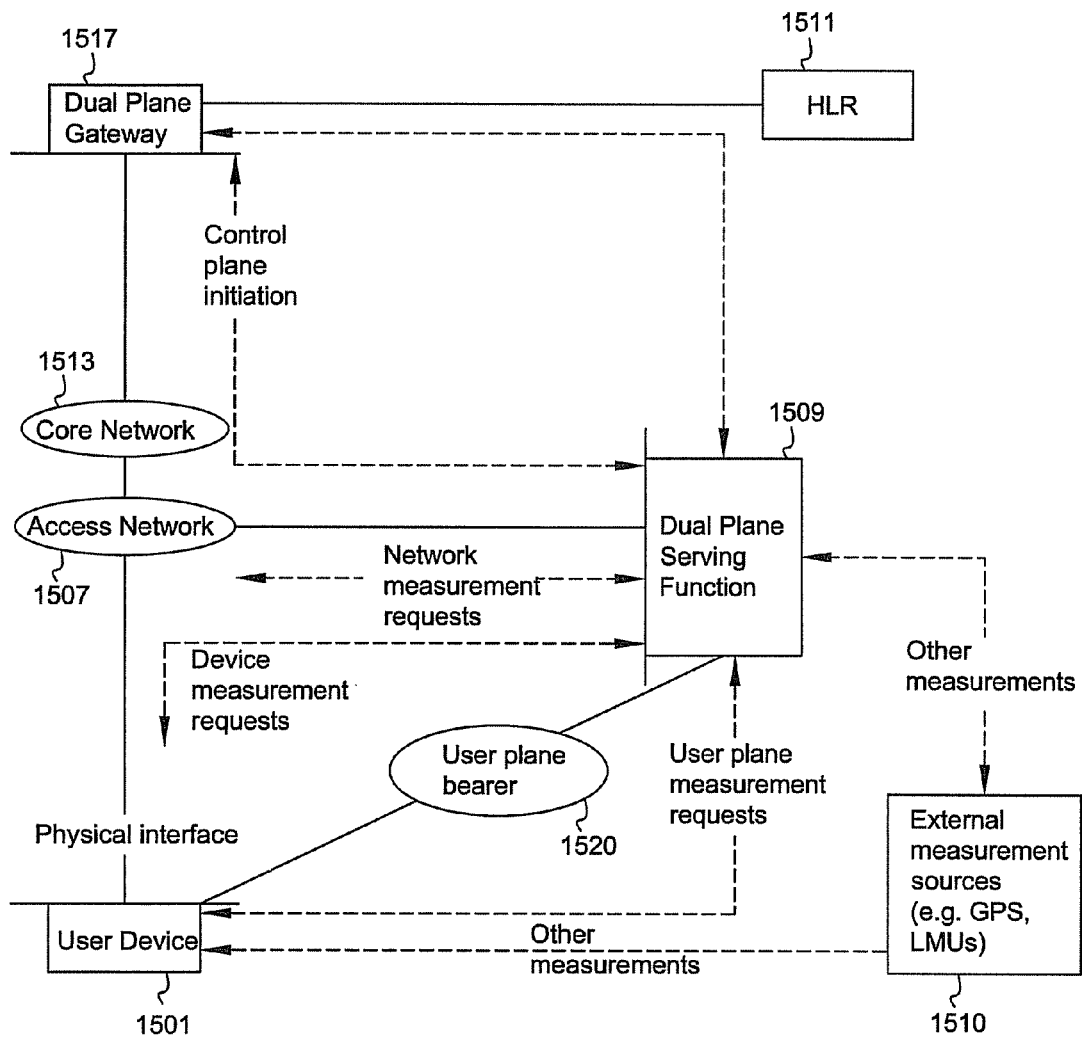
FIG. 15 illustrates an embodiment of a dual plane architecture.

FIG. 15 is a schematic architectural illustration of a disclosed embodiment including a dual-plane architecture. By integrating a standard control-plane architecture as shown in FIG. 2B with SUPL functionality as shown in FIG. 3B, a flexible and powerful dual-plane architecture is provided.

The Dual Plane gateway 1517 is now the network element that receives the location requests. The Dual Plane Gateway may invoke a CoPL session by querying the HLR 1511 over the Lh interface to find out which part of the access network 1507 the target device is currently being served by if the CoPL is invoked or may initiation SUPL by establishing a user plane bearer 1520 between the Dual Plane Serving Function 1509 and the User Device 1501. As noted before the selection may be based on the application that made the location request, the capabilities of the network, the capabilities of the user device or request parameter etc.

If the CoPL is chosen by the Dual Plane Gateway 1517. The Dual Plane Gateway 1517 sends a location request to the current serving core network node 1513 via the Lg interface. The current serving core network node 1513 then passes the request to the part of the access network 1507 that the target device is attached. This access network element 1507 then invokes the facilities of the Dual Plane Serving Function 1509. The location request session between the access network node 1507 and the Dual Plane Serving Function 1509 provides a channel by which the Dual Plane Serving Function 1509 can request network measurements or send messages to the end-user device 1501 so that device measurement information can be exchanged. The Dual Plane Serving Function 1509 may also obtain location measurement information from external devices 1510 such as location measurement units (LMUs) which take RF readings from the air interface for example. Similarly, the device may also take measurements from external systems, such as GPS satellites, and communicate these to the Dual Plane Serving Function 1509. The Dual Plane Serving Function 1509 contains the functionality of the SMLC 109 of FIG. 2B as well as the functionality of the SLP 201 of FIG. 3B.

If the Dual Plane Gateway 1517 selects the SUPL, then user plane is initiated through a request to the Dual Plane Serving Function 1509, which initiates a request such that an user plane bearer 1520 is established between the device 1507 and the Dual Plane Serving Function 1509. The Dual Plane Serving Function 1509 may request measurement information from the device 1507. The device 1507 as noted previously, may also take measurements from the network 1507 or from external systems such as GPS 1510.

Figure 16:
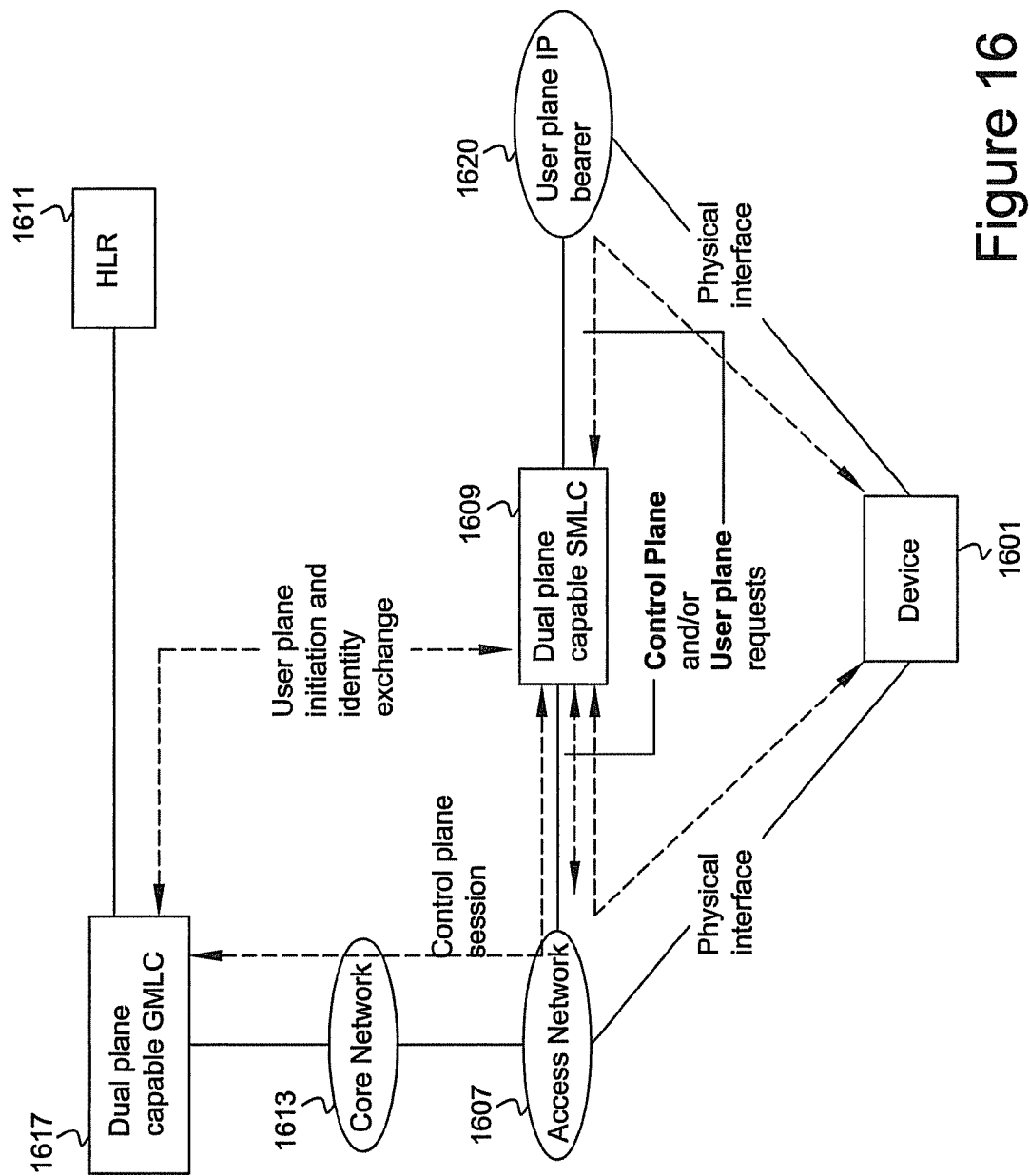
FIG. 16 illustrates the implementation of the dual plane architecture of FIG. 15.

FIG. 16 shows an example of a dual-plane implementation combining GPRS/SMLC functionality with SUPL. The Dual-plane capable GMLC 1609 is the dual-plane gateway device shown in FIG. 15. It can determine the part of the network that the device is currently in by querying the HLR 1611 and use this information, for example, to arbitrate between GPRS CoPL or SUPL for the location determination, as noted above. Further, if it invokes CoPL then the request will reach the dual-plane capable SMLC 1609 via an established network measurement channel established with the Access network 1608 and the Dual Plane capable SMLC 1609 is still able to invoke SUPL if it is determined SUPL is the most effective way to obtain measurements from the device 1601, while still being able to obtain additional measurements via the control-plane session with the network 1607. The Dual Plane capable GMLC 1617 may initiate a User plane session via a request to the Dual Plane capable SMLC 1609. Further, for a device that is both SUPL and CoPL capable, the Dual Plane capable SMLC 1609 may obtain some types of measurements from the device 1607 via the SUPL session over the User plan bearer 1620 and others via the CoPL session.

Although various nodes are depicted as collocated or integrated, separate implementation (for example, providing a GMLC distinct from an SLM) is also contemplated by these exemplary embodiments of dual-plane architecture.

In the illustrated example, the GMLC/SLM 403 obtains location information from either an LCS standard CoP request or a direct SPC function request.

When location information is obtained using a direct SPC function request, the GMLC/SLM 403 relays location information is provided over the IP network 407 to the SPC 405 by the UE/SET 409 to the LBS 401 over the Le interface.

Alternatively, when location information is first obtained using a CoP request, the SMLC function, which receives the control-plane Position Location & Reporting (PLR) request, can access both control plane and user-plane measurement resources to optimize the yield, speed, and accuracy of the location result. With access to both measurement planes, the SMLC/SPC 405 may make dynamic decisions as to which planes should be used on a request-by-request basis and independent of the application. In addition, to selecting between control and user planes for location determination, the SMLC/SPC 405 may also compare or combine the results using weighting algorithms based on the time of measurement, estimated uncertainty, and velocity measurements.

Figure 5:
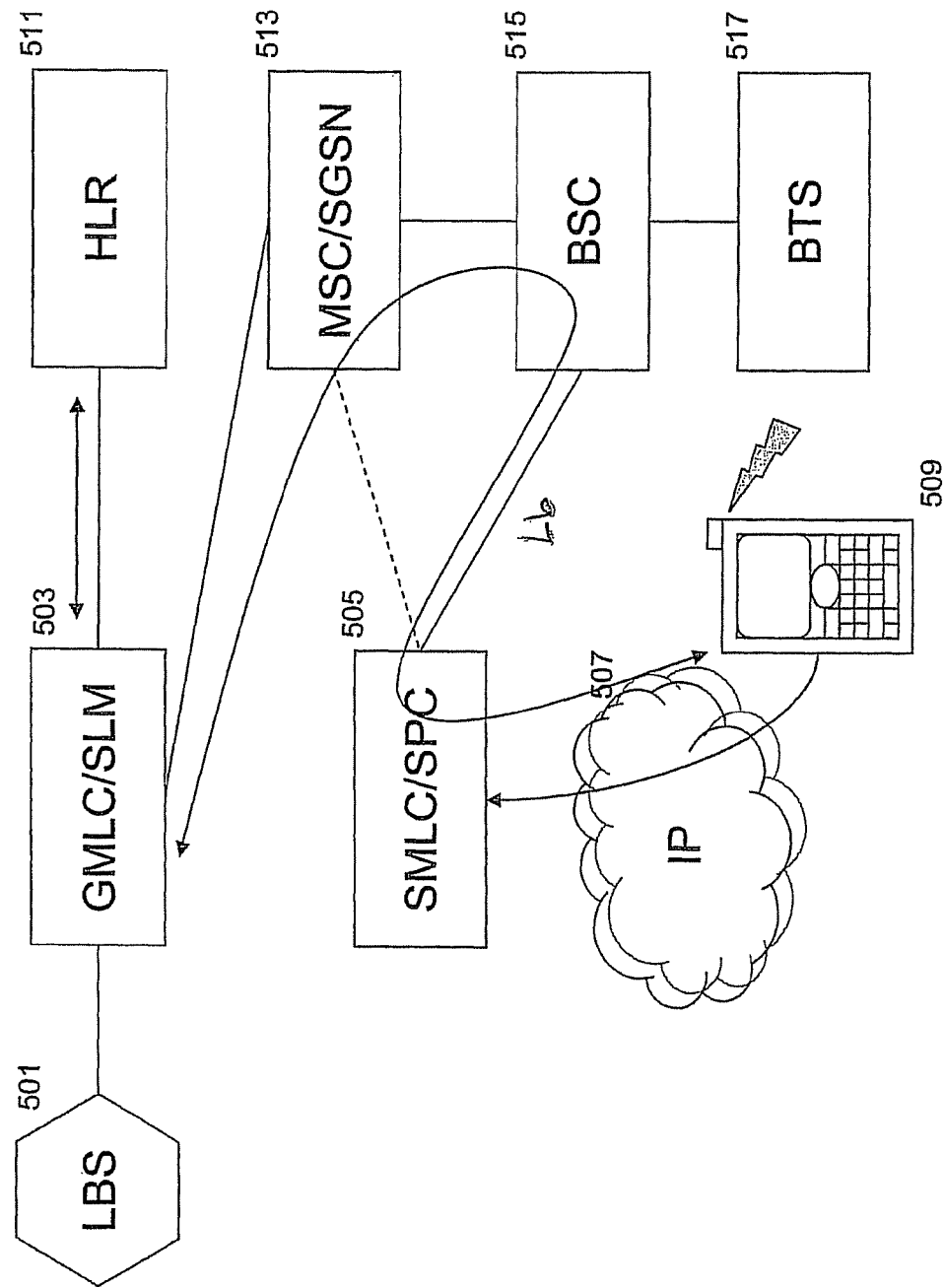
FIG. 5 is a schematic architectural illustration of another disclosed embodiment depicting a SET-terminated/CoPL initiated position determination.

FIG. 5 is a schematic architectural illustration of another disclosed embodiment depicting a SET-terminated/CoPL initiated position determination. SUPL position determination can still be invoked even if the request is initiated over the CN control plane.

In the illustrated example, the location of the UE/SET 509 is being determined by CoP signaling involving the HLR 511, MSC/SGSN 513, BSC 515, and SMLC/SPC 505. Based on the CoP position requirements and measurements, the SMLC/SPC 505 optionally determines whether or not to initiate a SUPL location determination session with the UE/SET 509. This determination by the SMLC/SPC 505 may involve the requested or required accuracy of position information, such as the speed with which it is needed by the LBS 501 requestor, or the estimated speed with which the network could accomplish a CoPL versus a SUPL location request. For example, if the Quality of Position (QoP) indicates a coarse or rapid position fix is desired by the requestor, the Timing Advance (TA) or Network Measurement Report (NMR) values will be provided as part of the PLR from the BSC. In such a situation, a SUPL session is optionally not invoked, thereby avoiding SUPL session overhead.

Further, the dual-plane architecture also provides load sharing based on request routing in the CN. SPC nodes can be deployed and distributed according to network coverage similar to the deployment scheme of SMLC nodes. By virtue of the request routing in the CN, the load created by multiple and simultaneous location requests across the network is distributed. When a SET sends an INIT signal to a single Home-SLP (H-SLP) address, the SUPL Transaction ID in the INIT signal optionally identifies the specific SLC to which the session should be steered. The INIT signal includes, but is not limited to a ULP SUPL START or ULP SUPL POS INIT signal which contains SET capabilities. In alternative embodiments, a master SLP within the CN steers the session to the appropriate SLC.

To perform a SUPL location determination, the Mobile Station International ISDN Number (MSISDN) of the UE/SET 509 is required. As the Lb interface between the BSC and the SMLC/SPC supports delivery over the control plane of the MSISDN, the MSISDN of the UE/SET 509 can be provided to the SMLC/SPC 505 to initiate the optional SUPL session. In one approach to a method of providing the MSISDN to the SMLC/SLP 505 in a dual-plane architecture, the International Mobile Subscriber Identity (IMSI) (or another unique identifier) is used to query the HLR 511 and retrieve the associated service separator (such as the MSISDN): The retrieved MSISDN is then provided to the SMLC/SLP 505 for initiating the SUPL session. Methodology to obtain the MSISDN are further described in detail.

Figure 6:
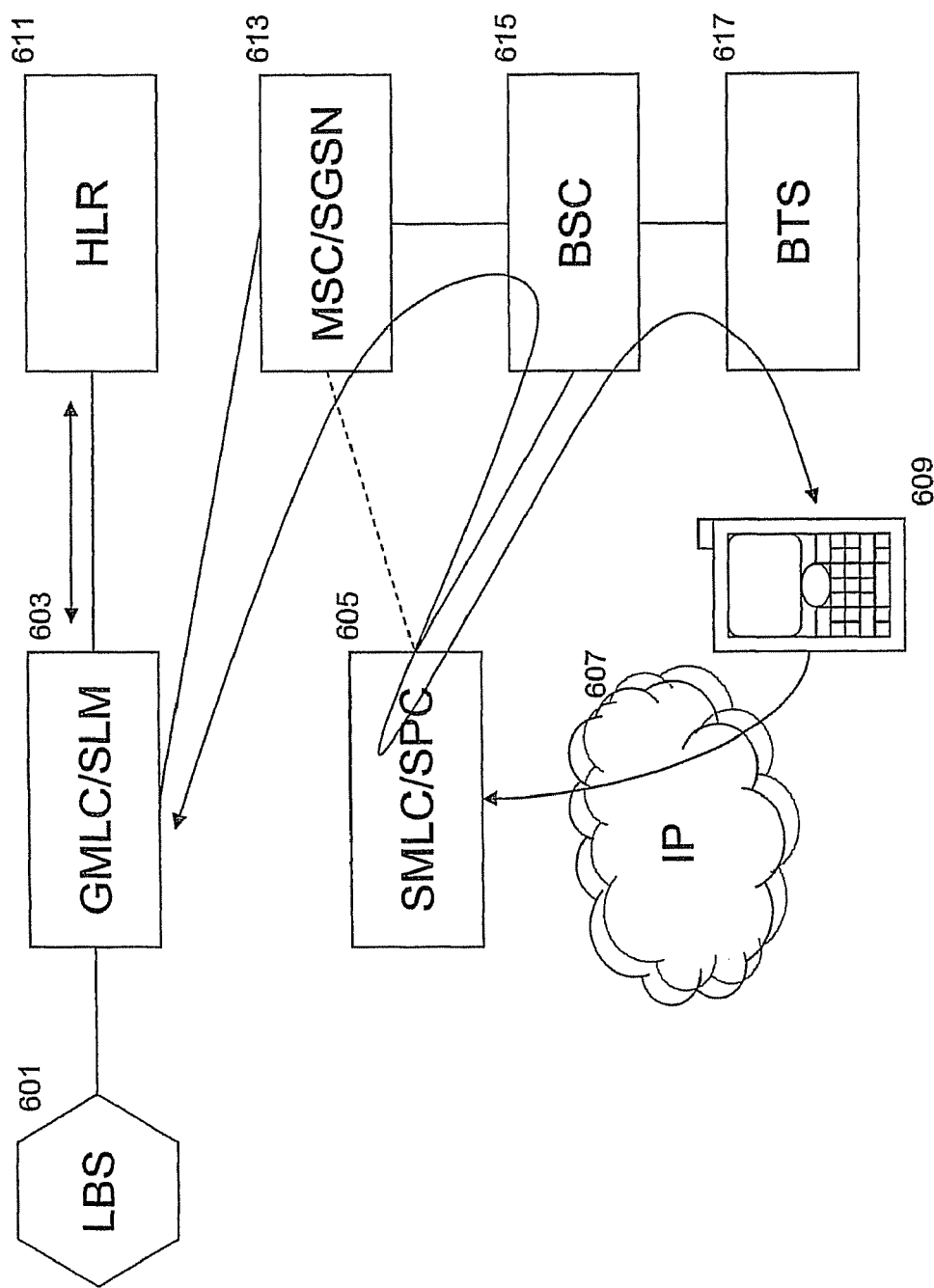
FIG. 6 is a schematic architectural illustration of an additional disclosed embodiment depicting a MS-terminated/CoPL initiated position determination.

FIG. 6 is a schematic architectural illustration of an additional disclosed embodiment depicting a MS/UE-terminated/ CoPL initiated position determination.

In the illustrated embodiment, the SMLC/SPC 605 receives device information via a control plane signal. Optionally, the control plane signal is a PLR signal. The control plane signal includes device information including, but not limited to, a classmark. The classmark indicates to the SMLC/SPC 605 the capabilities of the UE/SET 609. In particular, the classmark and related device information indicate whether the device 609 has control plane GPS or other LCS capabilities.

Based on the device information, the SMLC/SPC 605 optionally selects whether to initiate a SUPL session. For control plane GPS capable devices, position determination can be done without invoking the overhead of a SUPL session. The SMLC/SPC 605 can consult the network cell information to determine whether control plane GPS is supported on that part of the access prior selecting CoPL or SUPL GPS. On receipt of an emergency request, (Network Initiated-LR or Mobile Terminated-LR), the SMLC/SPC 605 can be configured to always do CoPL or not including arbitration based on QoS. Methods of arbitrating among protocols, such as control plane and user plane location modalities in a mixed access environment, are discussed at greater length later in the disclosure. Alternatively, the 3GPP standards allow room to add a "SUPL-capable" code-point to the classmark information to inform the SMLC/SPC 605 of SET 609 capability without having to first attempt a SUPL session.

Figure 7:
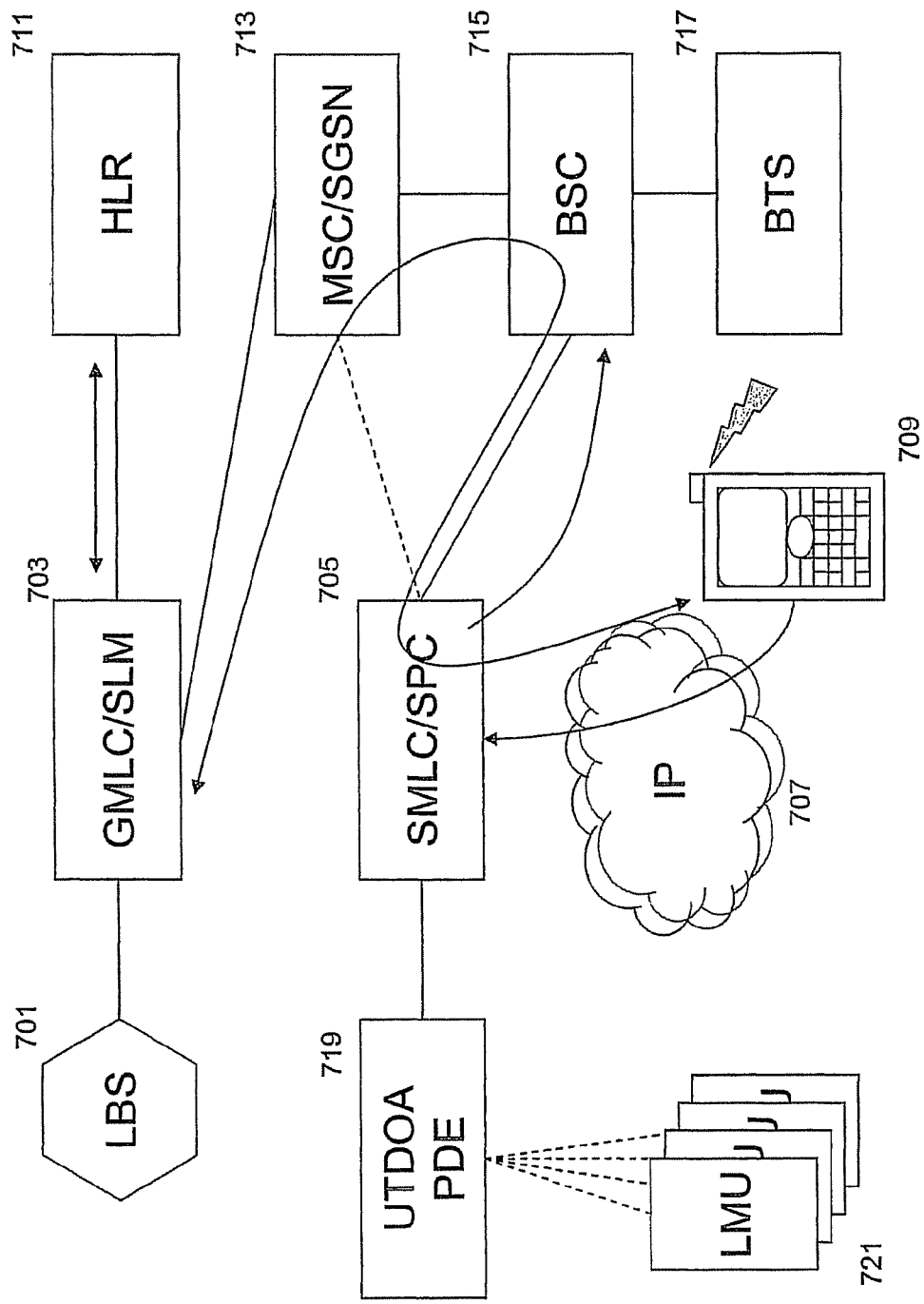
FIG. 7 is a schematic architectural illustration of yet another disclosed embodiment depicting a position determination including SUPL termination with CoPL measurements.

FIG. 7 is a schematic architectural illustration of yet another disclosed embodiment depicting a position determination including SUPL termination with CoPL measurements. In the illustrated embodiment, both CoPL and SUPL sessions are being invoked. These sessions can optionally occur concurrently or within a predetermined time interval, for example, related to UE velocity or QoP requirements by the requestor.

In this embodiment, the SMLC/SPC 705 can utilize the concurrent CoPL session while the SUPL session is invoked to gather additional measurements from the network. For example, the SMLC/SPC 705 may make a UTDOA request to the BSC 715 and obtain the information required to prime LMUs 721 to enable UTDOA measurements by the UTDOA Position Determination Entity (PDE). The network measurements from the CoPL signaling is optionally used to provide a higher accuracy fallback location than a mere cell location supported by SUPL alone. Further, the CoPL-obtained network measurements are optionally used in conjunction with SET 709 GPS measurements to perform hybrid location determination, thereby providing an improvement over the yield of SUPL GPS on its own.

Figure 8:
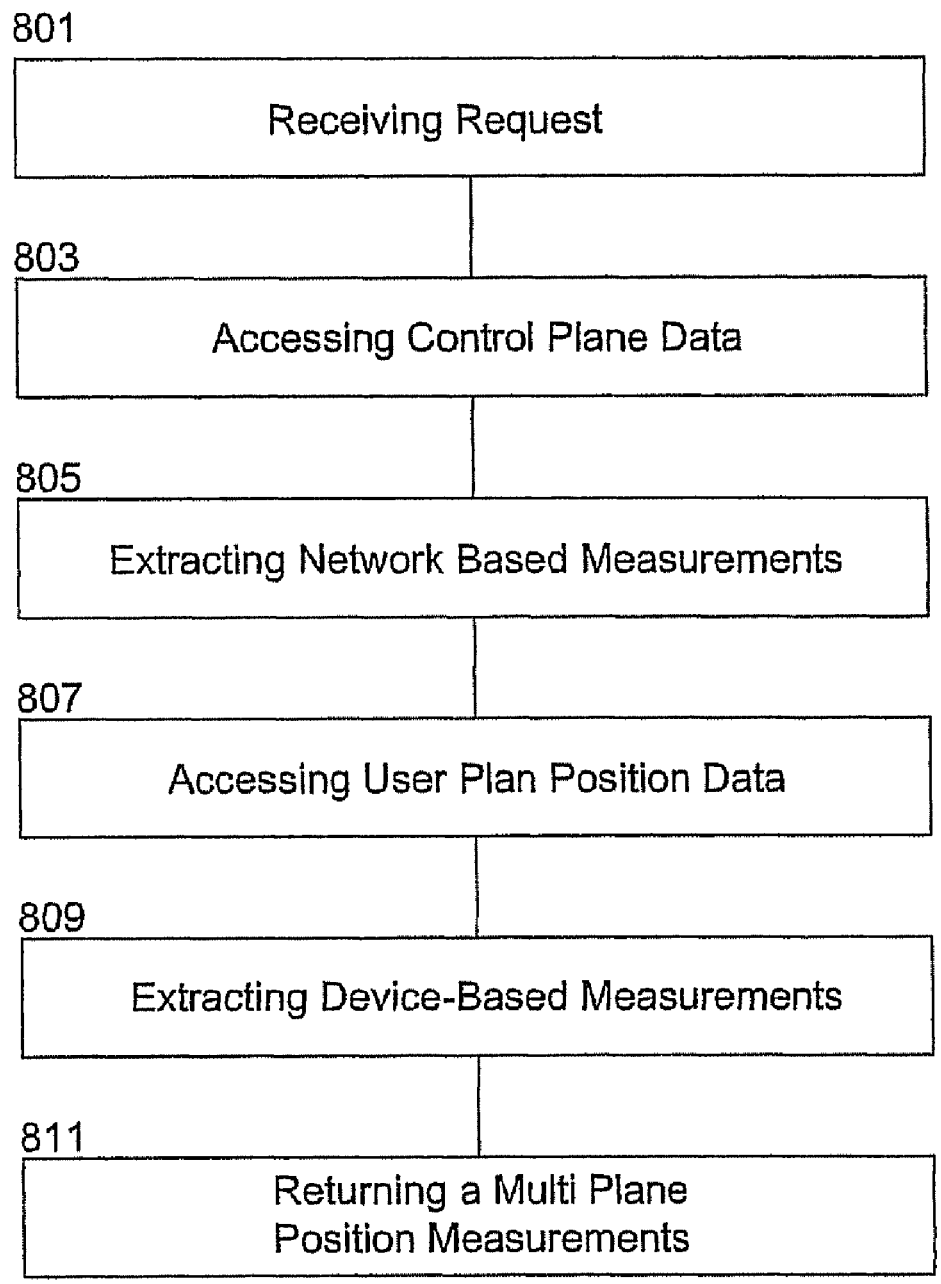
FIG. 8 illustrates an exemplary flow chart relating to a disclosed embodiment for comparing or combining the results of multiple position determination protocols.

FIG. 8 illustrates an exemplary flow chart relating to multiplane position determination in a wireless communications: In block 801 a request for location of a mobile device is received from a LCS. The control plane data of the network is accessed in block 803 and network based measurements. For example, NMR and TA are extracted in block 805. The UPL data is accessed in Block 807 and the device based measurements are extracted in Block 809. Using both the network based measurement and the device based measurements a multiplane position measurement may be determined as shown in Block 811. Both the network based measurements and the device based measurements as noted earlier may also include external sources, such as LMU and GPS.

Figure 9:
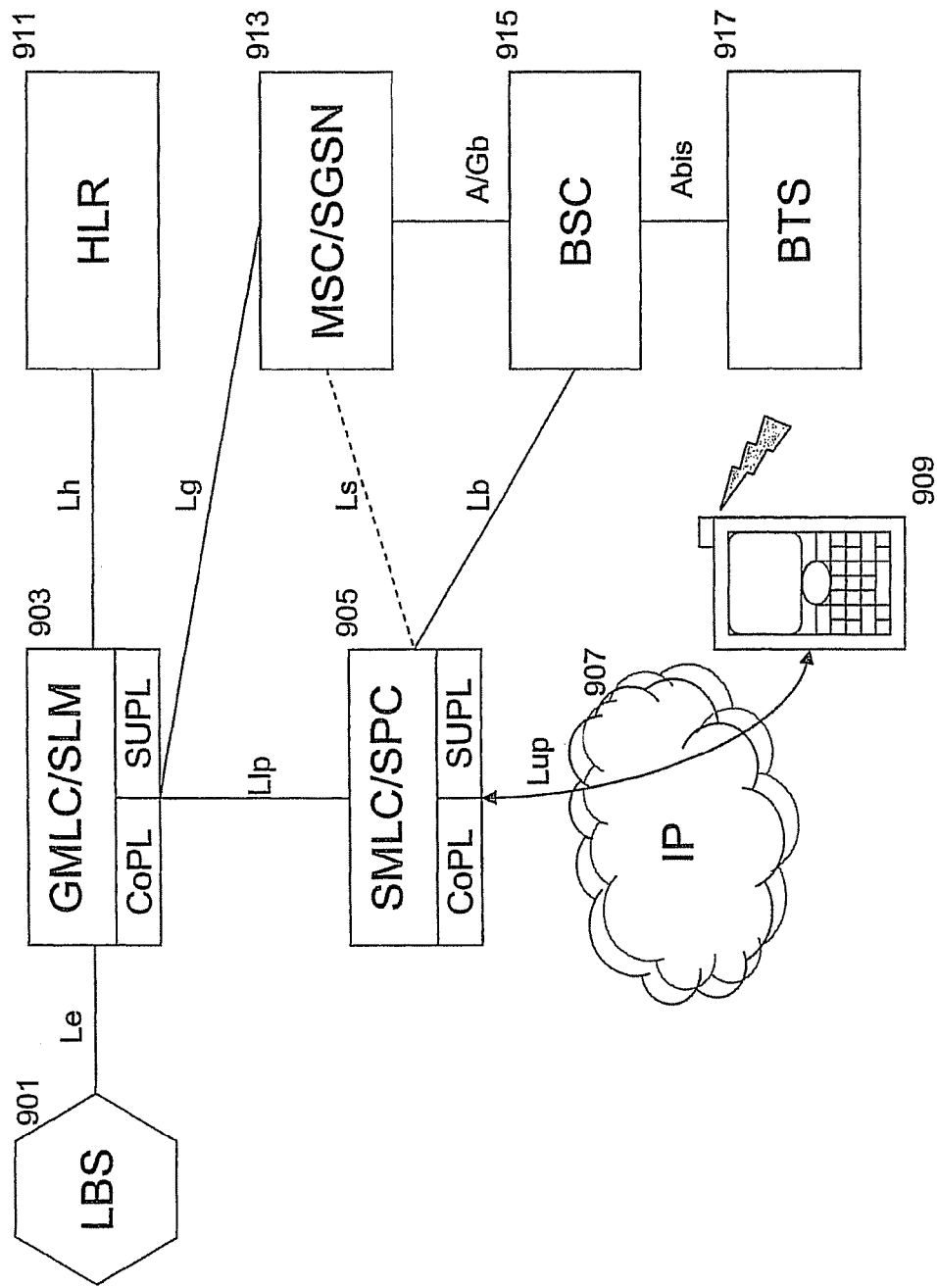
FIG. 9 is a schematic architectural illustration of another disclosed embodiment depicting a technology arbitration.

FIG. 9 is a schematic architectural illustration of another disclosed embodiment depicting a technology arbitration. In particular, selected embodiments enable selection of a preferred location determination protocol. Whereas, a SUPL-only deployment or CoPL-only deployment precludes any use of the other protocol to process location requests, a dual-plane architecture creates the possibility of arbitrating between protocols and choosing an optimum or preferred protocol on a request-by-request basis.

With a dual-plane architecture, the SMLC/SPC 905 has information, such as the classmark of the UE/SET 909, on which to base the arbitration. As discussed previously, the received classmark indicates the control-plane capabilities of the device. Further, the network information in the SMLC/ SPC 905 informs it of the capabilities of the access. Based on device and access capabilities, the SMLC/SPC 905 can effectively arbitrate between relying on control plane positioning, user plane positioning, or both.

Alternatively, the protocol decision may be made in the GMLC/SLM 903. However, as the GMLC/SLM 903 is less aware of the device and access network capabilities on which to base the decision to select a protocol or modality, the GMLC/SLM 903 relies on the LCS Client ID such that some applications always invoke SUPL and others always invoke CoPL. Alternatively, the GMLC/SLM 903 relies on the MSISDN of the device 909.

Figure 10:
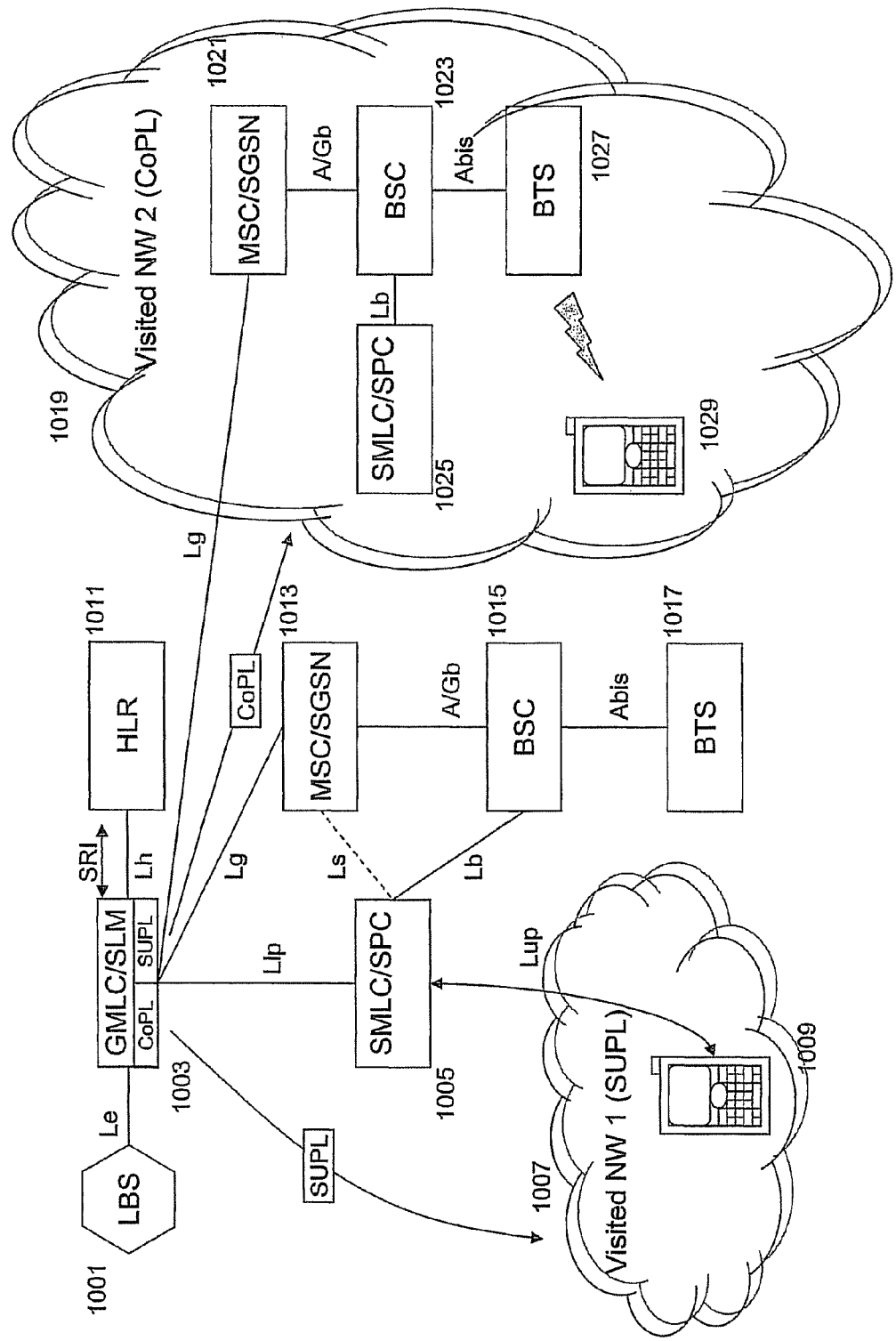
FIG. 10 is a schematic architectural illustration of yet another disclosed embodiment depicting roaming optimization.

FIG. 10 is a schematic architectural illustration of yet another disclosed embodiment depicting roaming optimization. Based on the identification of the serving network indicated by the routing information (for instance, the Send Routing Information, SRI, result from querying the HLR 1011), the GMLC/SLM 1003 can invoke CoPL or SUPL based on the returned routing information. When a subscriber is roamed out of the home network, it is possible that the visited network supports CoPL 1019, SUPL 1007, or neither. In a pure SUPL approach, a SUPL session is initiated with the SET 1009 but the cell information provided will likely not mean anything to the SMLC/SPC 1005. Alternatively, if the visited network actually supports CoPL 1019, sending a standard CoPL request into the visited core network, is more effective.

By invoking control plane signaling (for example, SRI) to the HLR 1011 first, the obtained routing information provides an indication of the identity of the visited network. The GMLC/SLM 1003 then dynamically decides whether the request is best initiated via the home network SUPL capability or via the control plane. When SUPL is selected, other SUPL-specific roaming support infrastructure may be accessed by the GMLC/SLM 1003 or SMLC/SPC 1005 to determine visited cell location information.

As noted above to perform a SUPL location determination, the MSISDN of the UE/SET 509 is required. The SPC needs to invoke the SUPL signaling via a WAP PPG, or SMSC. For WAP and SMS initiated ULP, the MSISDN of the SET is require. It should be noted by the invocation is normally an SLM function, the dual plane architectures has the initiation responsibility moved the SPC or more appropriately SMLC/SPC. In the prior art, there is no signaling support to deliver the MSISDN or current IP address to the SMLC. Typically CoPL location signaling has the location procedure initiation at the SMLC done with a PerformLocationRequest (PLR) message. The PLR message includes the option of providing the IMSI or IMEI of the device. However, the IMSI or IMEI, as discussed previously, is not sufficient to use for ULP initiation with either standard WAP-PPG or SMSC signaling. Furthermore, as described herein, the IMSE or IMEI may be used as a correlator where the MSISDN-IMSI or MSISDN-IMEI relationship is known. Advantageously the GMLC possesses both the MSISDN and the IMSI of the target device, this information may be obtained from a standard LCS SRI query to the HLR. Thus, by caching the MSISDN-IMSI or MSISDN-IMEI relationship, the GMLC may provide a well known query entity for the SPC to resolve the MSISDN value.

Figure 13:
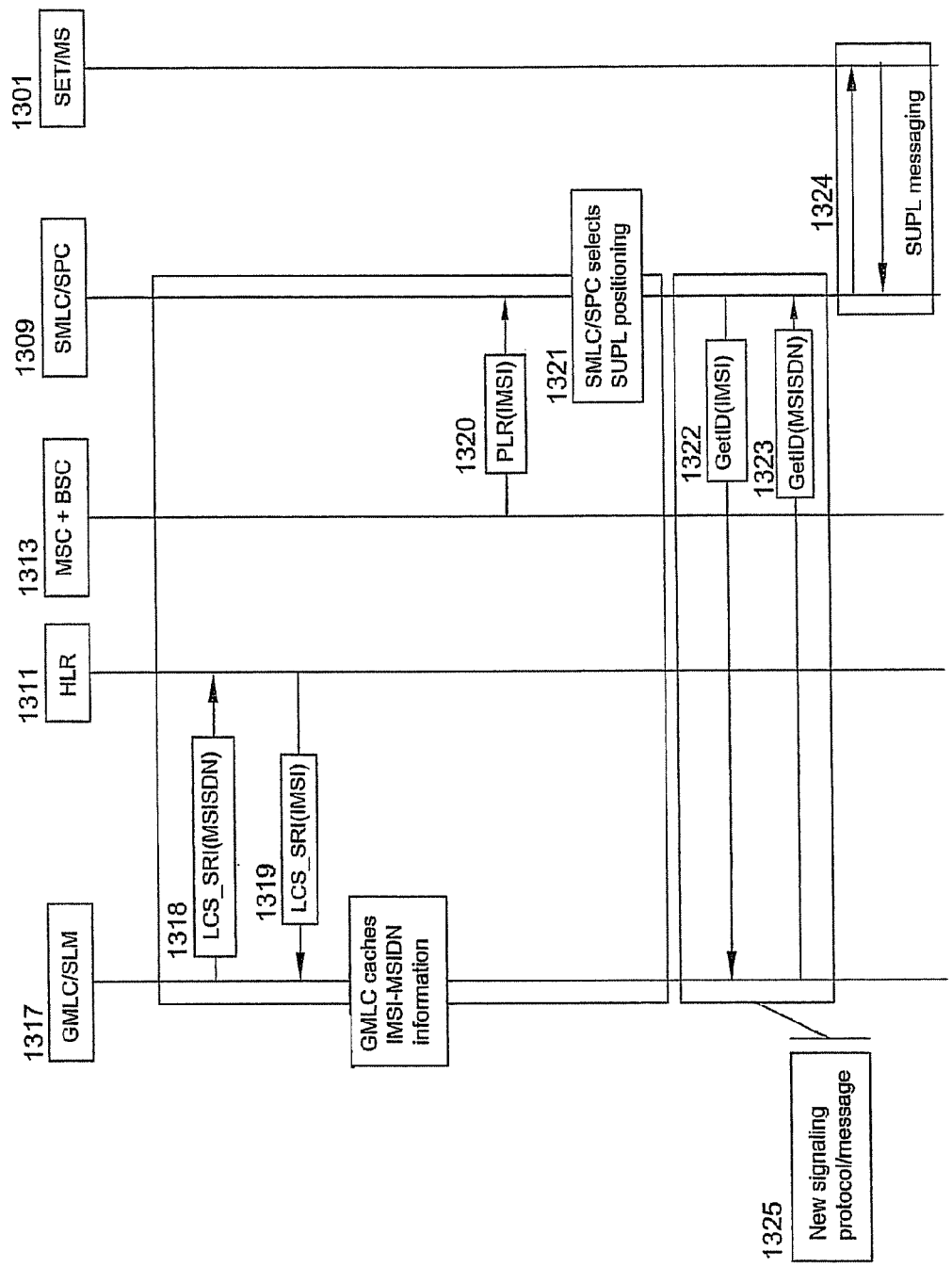
FIG. 13 is a schematic illustration of MSISDN caching and retrieval.

FIG. 13 is a schematic illustration of MSISDN caching and retrieval. The GMLC/SLM 1317 using a LCS_SRI (MSISDN) 1318 to the HLR 1311 request the IMSI or IMEI associated with the MSISDN. The HLR 1311 returns a LCS_SRI(IMSI) 1319 message the IMSI or IMEI of the device associated with the MSISDN. The GMLC/SLM 1317 then caches the IMSI-MSISDN or IMEI-MSISDN relationship information. When the SMLC/SPC 1309 receives a PLR 1320 with the IMSI included, and it further determines that SUPL should be used, it queries the GMLC 1317 with a GETID(IMSI) 1322 message to determine the associated MSISDN. The GMLC responses with a GETID(MSISDN) 1322 message which includes the MSISDN of the target device. The query occurs across a non-standard CoPL interface 1325 as shown in FIG. 13. The L1p interface is already defined in the SUPL architecture between the SLM 1317 and the SPC 1309 and thus may be used for this purpose. Whether this interface or another non-CoPL interface is used, the request semantics are the same; a IMSI or IMEI is provided and an MSISDN is received. Upon receipt of the MSISDN the SMLC/SPC 1309 proceeds with SUPL messaging 1324 with the SET/MS 1301.

Figure 11:
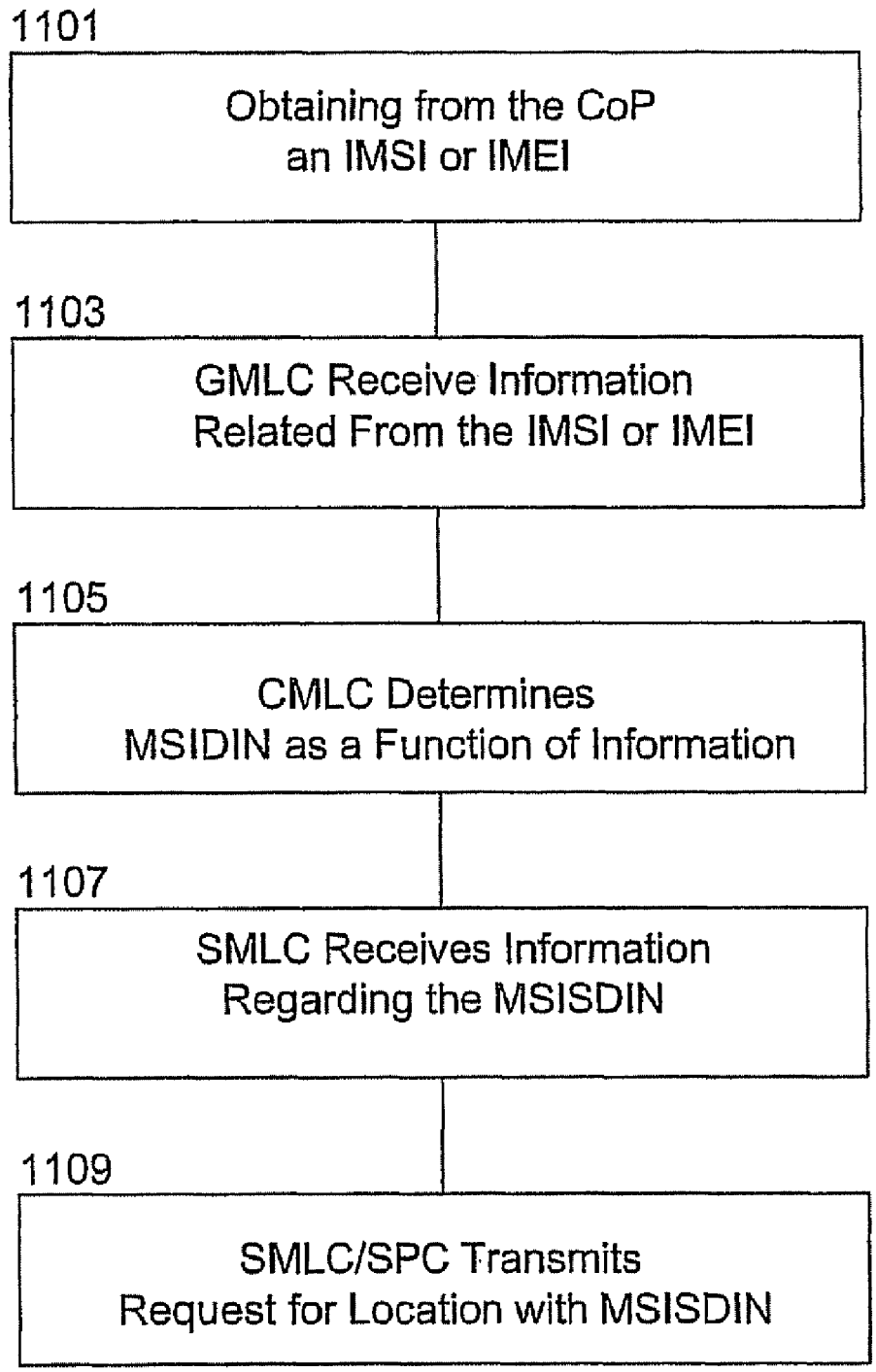
FIG. 11 illustrates an exemplary flow chart for determining a MSISDN for a mobile device in a multiplane wireless communication network.

FIG. 11 illustrates an embodiment for determining at the SMLC/SPC a MSISDN for a mobile device in a multiplane wireless communication network. The identity of the mobile in addition to being represented by the MSISDN may also be an IP address. As such, the method for determining the MSISDN would be illustrative for determining the IP address as well. The SMLC/SPC obtains via the CoP of the network an IMSI or IMEI of the mobile device as shown in Block 1101. The GMLC receives via the SUPL of the network, information related to the IMSI or IMEI from the SMLC/SPC as shown in Block 1103. The GMLC determines the MSISDN as a function of the information provided by the SMLC/SPC as shown in Block 1105. The SMLC the receives information relating to the MSISDN from the GMLC to determine the MSISDN as shown in Block 1107. The SMLC/SPC is now armed with the MSISDN of the mobile appliance, may transmit a request for the location of the mobile device as shown in Block 1109.

Figure 12:
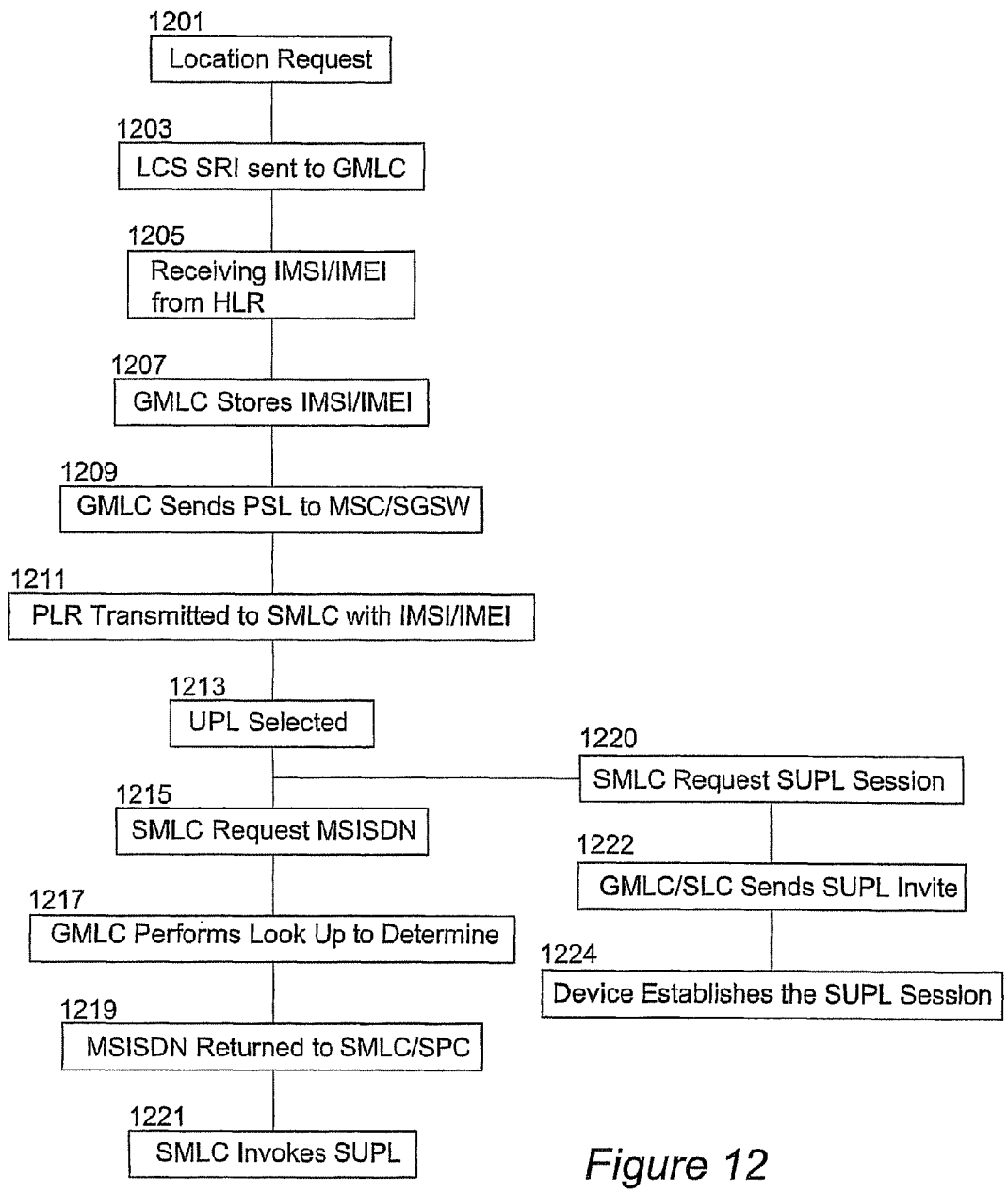
FIG. 12 illustrates an exemplary flow chart for resolving subscriber identification information in a multi-plane wireless communication network.

FIG. 12 illustrates an embodiment for resolving subscriber identification information in a multi-plane wireless communication network which includes a GMLC/SLM, a HLR, a MSC and a SET. In block 1201 a location request is initiated through a control plane. In block 1203, a LCS sends routing information (LCS SRI) request is sent from the GMLC to the HLR where the MSISDN is associated with a mobile subscriber identifier. In block 1205, the HLR responds to the LCS SRI and provides the IMSI/IMEI that corresponds to the MSISDN. The GMLC stores the provided IMSI/IMEI with the associated MSISDN as shown in Block 1207. The GMLC sends a ProvideSubscriberLocation (PSL) message to the MSC/SGSN, which independently determines the IMSI/IMEI as shown in Block 1209. The PLR either directly of via the BSC is transmitted to the SMLC with the IMSI and/or IMEI in Block 1211. User plane positioning may then be selected for the location request as shown in Block 1213 and the SMLC requests the MSISDN associated with the IMSI/IMEI from the GMLC in Block 1215. The GMLC performs a look up to determine the MSISDN associated with the IMSI/IMEI in Block 1217. The MSISDN is then returned to the SMLC/SPC in Block 1219 and the SMLC/SPC invokes a SUPL signal to the SET based on the MSISDN and the IMSI or IMEI as shown in Block 2121.

Alternatively, the SMLC instead of requesting the MSISDN in Block 1215, may request the GMLC to initiate a SUPL session with the device with the MSISDN associated with the IMSI/IMEI as shown in Block 1220. In which case the GMLC/SLC sends the appropriate SUPL initiation request the device with the corresponding MSISDN as shown in Block 1222. Once the GMLC/SLC indicates the SUPL session, the device establishes the session with the SMLC/SPC with the appropriate SUPL start message as shown in Block 1224. At the expiration of the location request the information relating the IMSI/IMEI and the MSISDN may be deleted.

As described previously, standard LCS control plane signaling can identify the current core network serving entity or MSC. This may be useful in arbitrating between SUPL and CoPL at this granularity of network coverage, for example, in making a roaming decision. However, a greater amount of detail may be useful. For example, multiple radio network controllers, BSCs may be subtended off a single MSC. Some of these radio network controllers may support CoPL LCS signaling and some may not. Thus, a CoPL request for a device in this area of coverage may fail. Having knowledge before selecting CoPL versus SUPL would therefore be more optimal and efficient than selecting a COPL and falling back to SUPL on failure of the CoPL. In view of this, where the standard CoPL signaling does not provide detailed information about the serving radio network area, other messaging may advantageously be used. For example, the 3GPP standard LCS_SRI message does not provide access serving area information, but, the 3GPP CAMEL standard AnyTimeInterrogation (ATI) message response has the ability to provide the current serving access area information.

Since information associated with the serving area is available, it is beneficial to take advantage of improving optimization and efficiency. Therefore, preceding any CoPL or SUPL signaling with a request, such as ATI, permits the GMLC/SLM to select the most suitable signaling mechanism for that area of coverage. This can be accomplished by exploiting existing core network MAP signaling to the HLR using the MAP-ANY-TIME-INTERROGATION request message. This message will return a serving area identifier which by reference to a database, can be used to determine whether the network operator would prefer control plane or user plane signaling to be utilized in the performance of a location services request.

Figure 14:
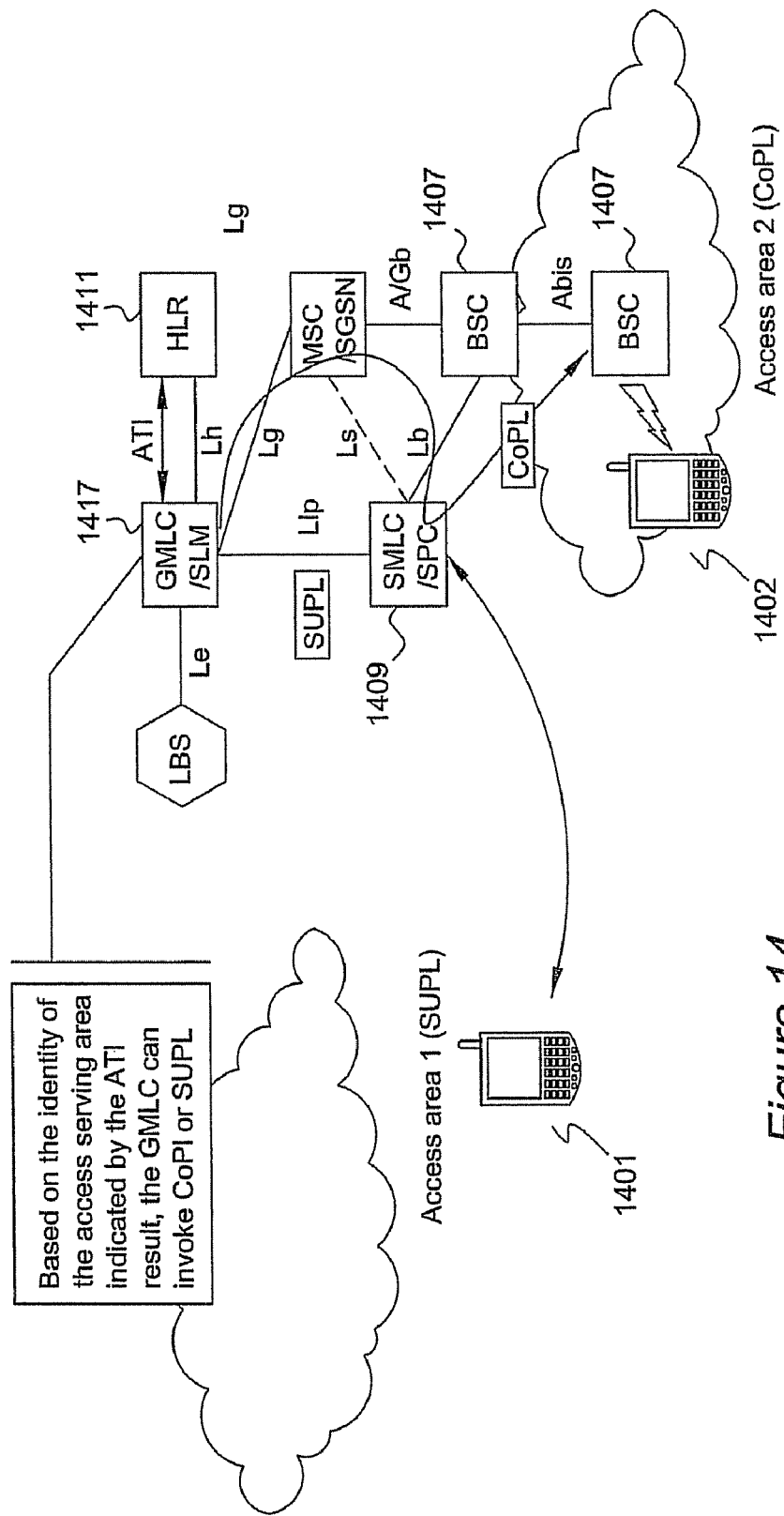
FIG. 14 illustrates a method for choosing a protocol layer for sending a location request signal to a mobile device where the mobile device is operating in a wireless network.

FIG. 14 illustrates a method for choosing a protocol layer for sending a location request signal to a mobile device where the mobile device is operating in a wireless network using an yet unknown standard having a CoPL and a SUPL. The yet unknown network standard likely being one of GSM, GERAN, UTRAN. As shown, the GMLC/SLM 1417 sends an ATI message, specifically a MATI message, to the HLR 1411. This message may be sent via the wireless network's Mobile Application part signaling system. The HLR 1411 will in turn respond with a serving area identifier. The GMLC/SLM 1417, using the serving area identifier with reference to a database can determine whether to invoke CoPL or UPL. As shown in FIG. 14, the serving area identifier of Access area 1 results in SUPL being invoked to determine the location of the mobile appliance 1401. However, in Access area 2, the serving area identifier with reference to the database results in the selection of CoPL being invoked to determine the location of the mobile appliance 1402.

The method for choosing the protocol layer, i.e. the CoPL or UPL, may be implemented in computer readable code, and distributed across network elements.

The various dual-plane LCS architectures described herein advantageously optimize speed, yield, accuracy, and roaming performance of location/position determination with CoPL and SUPL.

By utilizing network signaling facilities available through a mobile network control plane, it is possible to extract data which can be used to more precisely control the invocation of user-plane location signaling. This improves the overall latency and yield of the location services infrastructure in place for the cellular network. Further, by supporting the extraction of network-based measurements using control-plane signaling and using them in conjunction with measurements obtained by user-plane signaling, the accuracy and yield of individual location requests can also be improved.

Any process descriptions or blocks in flow charts should be understood as representing modules, segments, or portions of computer software or code which include one or more executable instructions for implementing specific logical functions or steps in the process, and alternate implementations are included within the scope of the preferred embodiment of the present disclosure in which functions may be executed out of order form that shown or discussed, including substantially concurrently or in reverse order, depending on the functionality involved, as would be understood by those reasonably skilled in the art of the present disclosure.

As noted previously location requests may also come from the device or other parts of the network. These may come directly via the UP or via the CoP. In the case of the former, and for reasons previously described, the rest of the session will typically be limited to UPL procedures. However, for a request that is initiated on the CoP, the serving location platform may, as already described, still be able to arbitrate between or combine CoPL and UPL procedures to determine location.

It should be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure, the present disclosure and protected by the following claims.

The embodiments disclosed herein for providing for protocol selection and position determination can be implemented using computer usable medium having a computer readable code executed by special purpose or general purpose computers.

What is claimed is:

1. A method for position determination in a wireless communications network having a dual plane capable Gateway Mobile Location Center (GMLC) and including a user device, comprising steps of:
   (a) receiving a request for location information;
   (b) invoking one of at least a control plane and a user plane based on at least one of the group consisting of requesting application, known user device capabilities and network capabilities.

2. The method of claim 1, further comprising
   (c) querying a Home Location Register (HLR) for information;
   (d) receiving information regarding network capabilities; and,
   (e) invoking a location determination session based on at least the received information.

3. The method of claim 1, wherein the step of invoking a location determination session further comprises comparing the network capabilities against a request parameter received with the request for location information and invoking a location determination session based at least on the comparison.

4. The method of claim 1 further comprising:
   establishing a control plane location session;
   extracting network-based measurements from the control plane data;
   comparing the network-based measurements with the request parameter; and,
   selectively invoking a user plane location determination session based on the comparison.

5. The method according to claim 3, wherein the request parameter is location accuracy.

6. The method according to claim 3, wherein the request parameter of the request is requested speed for the location.

7. The method according to claim 4, wherein the network based measurement is timing advance (TA).

8. The method according to claim 4, wherein the network based measurement is network measurement report (NMR) data.

9. The method according to claim 1, wherein the step of invoking a location determination session is based at least upon the duration of a control plane location session and a user plane location session.

10. The method according to claim 4, comprising the step of determining the location based on based on the network based measurements.

11. The method according to claim 3, wherein the parameter of the request is estimated speed for the location.

12. A method for selectively invoking a position determination session in a wireless communications network including a user device, comprising steps of:

(a) receiving a request for location information;
(b) accessing control plane position (CoPL) data;
(c) extracting network-based measurements from the control plane position data;
(d) determining a user plane invocation parameter based on network access or device information associated with a user plane; and
(e) invoking a user plane position determination session, based on the user plane invocation parameter and the network-based measurements.

13. The method according to claim 12, wherein the network-based measurements are a function of the Quality of Position (QoP) of the CoPL.

14. The method according to claim 13, wherein the network based measurement is timing advance (TA).

15. The method according to claim 13, wherein the network based measurement is network measurement report (NMR) data.

16. The method according to claim 13, wherein network access indicates whether control plane Global Positioning System (GPS) is supported.

17. The method according to claim 13, comprising the step of receiving device information from the control plane.

18. The method according to claim 17 wherein device information is a function of control plane Global Positioning System (GPS) and Location Services (LCS) capabilities of the device.

19. The method according claim 13 wherein network access is a function of Location Services (LCS) requester.

20. The method according to claim 13 wherein network access is predetermined by serving area.

21. A method for multi-plane position determination in a wireless communications network including a user device, comprising steps of:
    (a) receiving a request for location information;
    (b) accessing control plane position data;
    (c) extracting network-based measurements from the control plane position data;
    (d) accessing user plane position data;
    (e) extracting device-based measurements from the user plane position data;
    (f) returning a multi-plane position measurement based on at least the network-based measurements and the device-based measurements.

22. The method of claim 21, wherein the device-based measurements are Global Positioning System (GPS) measurements.

23. The method of claim 21, wherein the network based measurements are Angle of Arrival(AoA), Time Difference of Arrival (TDOA) or Time of Arrival (TOA) measurements from a plurality of Location measurement unit.

24. The method of claim 21, wherein the device-based measurements are of the network.

25. A method for selectively invoking a position determination session in a visiting communications network, comprising steps of:
    (a) receiving a request for location information;
    (b) sending a request message to a Home Location Register (HLR);
    (c) receiving information regarding the visiting network; and,
    (d) invoking a location determination session based on the information,
    wherein the location determination session is one of a control plane location (CoPL) and a user plane location (UPL) determination session.

26. The method of claim 25, wherein the information is a serving area identifier.

27. The method of claim 26, further including using the serving area identifier in conjunction with a database to invoke the location determination session.

28. The method of claim 26, wherein the serving area identifier is determined by the network operator.

29. The method of claim 25, wherein the information is routing information.

30. The method of claim 29, wherein the routing information indicated support for CoPL.

* * * * *